(12) United States Patent
Russ

(10) Patent No.: US 7,870,570 B2
(45) Date of Patent: Jan. 11, 2011

(54) DISK ELEVATOR SYSTEM

(75) Inventor: Wray Russ, Modesto, CA (US)

(73) Assignee: Microboards Technology, LLC, Chanhassen, MN (US)

(*) Notice: Subject to any disclaimer, the term of this patent is extended or adjusted under 35 U.S.C. 154(b) by 804 days.

(21) Appl. No.: 11/487,147

(22) Filed: Jul. 13, 2006

(65) Prior Publication Data

US 2007/0008835 A1 Jan. 11, 2007

Related U.S. Application Data

(60) Continuation-in-part of application No. 11/400,672, filed on Apr. 7, 2006, now Pat. No. 7,454,767, which is a division of application No. 10/334,607, filed on Dec. 30, 2002, now Pat. No. 7,032,232, which is a continuation-in-part of application No. 09/828,569, filed on Apr. 5, 2001, now Pat. No. 6,782,544, which is a continuation-in-part of application No. 09/088,652, filed on Jun. 1, 1998, now Pat. No. 6,337,842.

(51) Int. Cl.
*G11B 17/08* (2006.01)
*B65G 57/30* (2006.01)

(52) U.S. Cl. .................. 720/619; 414/797.9; 369/30.57

(58) Field of Classification Search .............. 369/30.34, 369/30.45, 30.55, 30.57, 30.6; 101/35–37, 101/43–44; 414/794.9, 795.3, 797.4, 797.9, 414/798.1; 720/619
See application file for complete search history.

(56) References Cited

U.S. PATENT DOCUMENTS

| | | | | |
|---|---|---|---|---|
| 4,143,871 A * | 3/1979 | Blessing | .................. | 271/10.01 |
| 4,283,047 A * | 8/1981 | Blessing | .................. | 271/10.01 |
| 5,235,579 A * | 8/1993 | Ross | ....................... | 369/30.56 |
| 5,692,878 A | 12/1997 | Freund | | |
| 5,703,453 A | 12/1997 | An | | |
| 5,914,918 A | 6/1999 | Lee et al. | | |
| 6,123,020 A | 9/2000 | Wolfer et al. | | |
| 6,337,842 B1 * | 1/2002 | Wolfer et al. | ............. | 369/30.57 |
| 6,782,544 B2 * | 8/2004 | Russ | .......................... | 720/619 |
| 6,922,379 B2 * | 7/2005 | Omoto et al. | ............ | 369/30.85 |
| 7,454,767 B2 * | 11/2008 | Russ | .......................... | 720/619 |
| RE40,598 E * | 12/2008 | Russ | .......................... | 720/619 |

OTHER PUBLICATIONS

International Search Report and Written Opinion, PCT/US07/73281, Sep. 5, 2008, 13 pages.

* cited by examiner

*Primary Examiner*—Brian E Miller
(74) *Attorney, Agent, or Firm*—Fish & Richardson P.C.

(57) ABSTRACT

Systems and methods are provided for transporting disks. In one implementation, a disk handling system is provided. The disk handling system includes a dispenser operable to dispense individual optical disks and one or more drives. The disk handling system also includes an elevator operable to transport optical disks received from the dispenser to the one or more drives along a first axis.

24 Claims, 22 Drawing Sheets

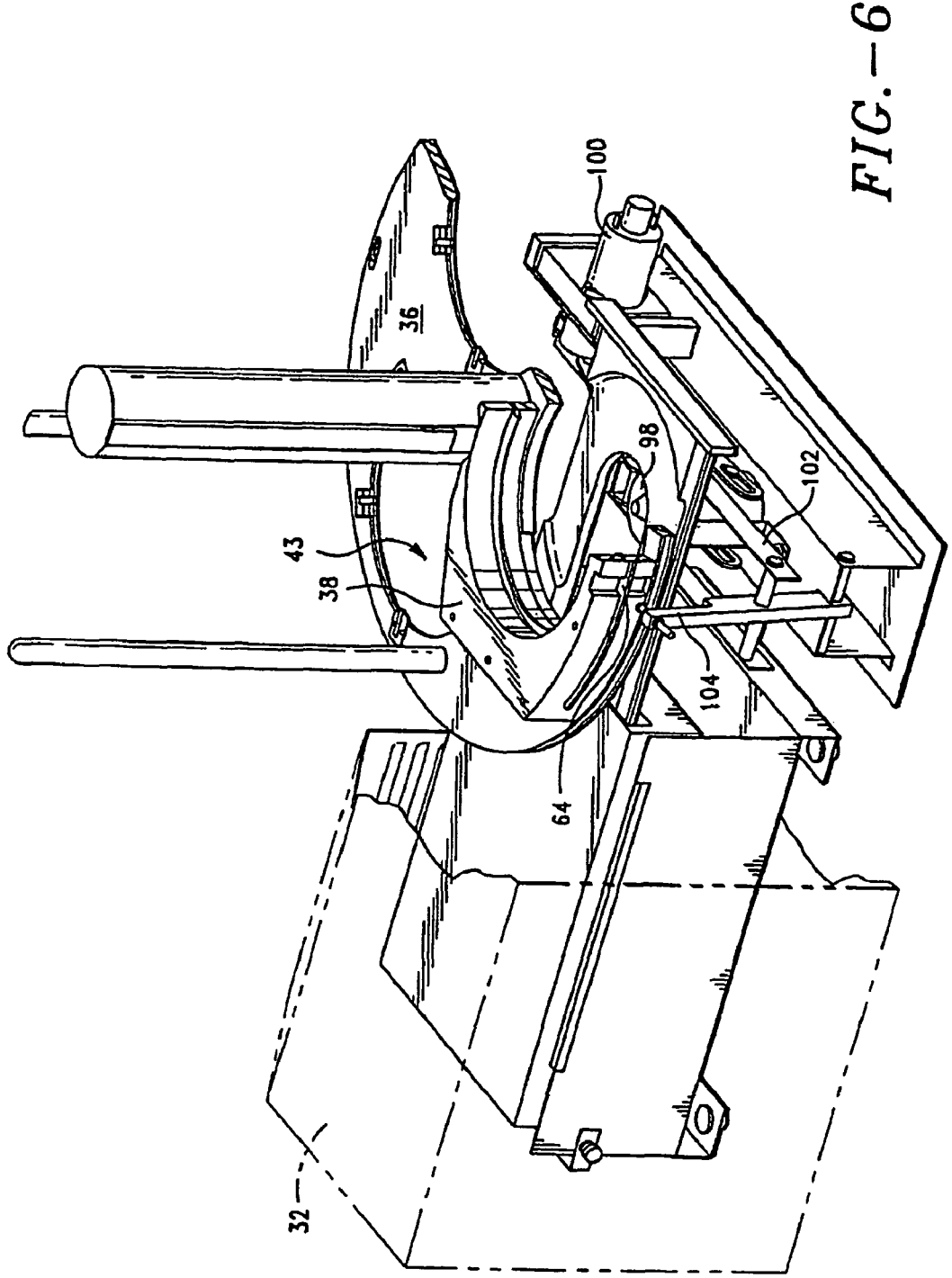

DISK ELEVATOR SYSTEM

CROSS-REFERENCE TO RELATED APPLICATIONS

This application is a continuation-in-part application of and claims priority to commonly assigned U.S. application Ser. No. 11/400,672, filed on Apr. 7, 2006, now U.S. Pat. No. 7,454,767 which is a divisional application of commonly assigned U.S. application Ser. No. 10/334,607, filed on Dec. 30, 2002, now U.S. Pat. No. 7,032,232, which is a continuation-in-part of commonly assigned U.S. application Ser. No. 09/828,569, filed Apr. 5, 2001 now U.S. Pat. No. 6,782,544, which is a continuation-in-part of commonly assigned U.S. application Ser. No. 09/088,652, filed Jun. 1, 1998, now U.S. Pat. No. 6,337,842.

BACKGROUND

The present disclosure relates to systems for transporting disks.

Optical disks, such as compact discs ("CD"s) or digital versatile discs ("DVD"s), are typically used to store digital data. Conventional recordable disks (e.g., CD-R, CD-RW) can have data directly recorded by placing the disk into a recording device. Typically, the recording device records data (e.g., "burns" the disk) using information received from a storage device (e.g., a hard disk drive).

Conventional disk handling systems are used to transport a disk from a stack of disks (e.g., a stack of CDs) at one location to another location. For example, typical disk handling systems move a single disk from a stack of disks to one or more workstations, including, for example, reading devices, recording devices, and printing/labeling devices. Some conventional disk handling systems use robotic arms to transport the disks, where the arm grabs a disk and moves the disk from the stack. Typical disk handling systems slide or lift disks from the top of the stack.

SUMMARY

Systems and methods are provided for transporting disks. In general, in one aspect, a disk handling system is provided. The disk handling system includes a dispenser operable to dispense individual optical disks and one or more drives. The disk handling system also includes an elevator operable to transport optical disks received from the dispenser to the one or more drives along a first axis.

Implementations of the system can include one or more of the following features. The elevator can be configured to receive an optical disk from one of the one or more drives and transport the optical disk to a conveyer. The elevator can include a horizontal arm having a distal end and a proximal end, a spindle coupled to a top side of the distal end of the arm and configured to hold an optical disk, a base coupled to the proximal end of the arm and configured to slidably attach the arm to one or more side walls of an aperture formed in a plate, the plate positioned in a plane substantially perpendicular to a plane of the arm, and a lifting means coupled to the slider, the lifting means operable to selectively move the arm along the first axis. The lifting means can selectively move the arm vertically to selectively raise or lower the arm. The slider can include one or more grooves configured to position the base between the side walls of the aperture.

The lifting means can include a first rotatable member and a second rotatable member. The lifting means can also include a first material looped around the first and second rotatable member, the first material coupled to the slider and a motor coupled to the first rotatable member such that the motor can rotate the first rotatable member. The first and second rotatable members can be coupled to the plate proximate to the aperture such that the rotation of the rotational members causes the first material to move the arm along the first axis. The first and second rotatable members can be cylindrical and include a groove along the circumference of the each of the first and second rotatable members, the groove configured to hold the first material.

The disk handling system can further include control circuitry operable to control operation of the motor. The first material can be a cable or a chain. The spindle can be substantially cone shaped and configured to hold an optical disk. The system can further include a second dispenser where the horizontal arm is configured to pivot such that the spindle selectively receives optical disks from either dispenser. The system can further include a second dispenser where the horizontal arm is configured to move along a second axis such that the spindle selectively receives optical disks from either dispenser. The dispenser can be configured to dispense a single optical disk from a bottom of a stack of optical disks.

The system can further include a hopper configured to hold a stack of optical disks above the dispenser. The one or more drives can be arranged beneath the dispenser. The system can further include a plurality of stacks, each stack having a one or more drives, where the stacks are positioned such that the elevator is operable to transport disks received from the dispenser to the one or more drives in each stack of the plurality of stacks. The system can further include a conveyer operable to remove optical disks from the system. The conveyer can be positioned beneath the one or more drives. An output of the conveyer can be coupled to a printing device. The one or more drives can be configured to record data. The one or more drives can be configured to print data to a surface of an optical disk.

The dispenser can include a first member configured to support a bottom disk of a vertical stack of disks, the first member including a horizontal surface that is configured to receive an outer edge of the bottom disk so that a bottom surface of only the outer edge rests on the horizontal surface. The dispenser can also include a second member operable in response to actuation to push the outer edge of the bottom disk off the horizontal surface, the second member having a thickness that is substantially equal to or less than a thickness of the bottom disk so that only the bottom disk is pushed, and a third member configured to prevent an outer edge of a next to bottom disk of the vertical stack of disks from being pushed off the horizontal surface when the second member pushes the bottom disk, the third member having a side surface configured to act as a stop, wherein actuation of the second member pushes only the bottom disk off the horizontal surface causing only the bottom disk to fall out of the dispenser.

In general, in one aspect, a system is provided. The system includes means for dispensing individual optical disks, one or more optical drives, and an elevator means for transporting optical disks received from the dispensing means to the one or more optical drives along a first axis.

In general, in another aspect, a method for handling a disk is provided. A single disk is dispensed to an elevator, the dispenser dispensing a disk from a bottom of a stack of disks substantially aligned with a first axis. The elevator is moved in a first direction along the first axis to load the disk into a tray of a first disk recording drive. The disk is recorded. The tray is extended after recording is complete. The elevator is moved in a second direction along the first axis to lift the disk from the tray. The tray is retracted and the elevator is moved in the first direction along the first axis to an unload position.

Particular embodiments described in the present specification can be implemented to realize one or more of the following advantages. The elevator system allows for quick and efficient transport of disks. A single elevator system can be used to vertically transport disks among several recording, printing, or other devices. The elevator system can be scaled for use with disk handling systems having one or more stacks of devices.

The details of the various aspects of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

FIG. 6 shows an example cutaway rear perspective view of the disk duplication system of FIG. 1.

Like reference numbers and designations in the various drawings indicate like elements.

DETAILED DESCRIPTION

Figure 1:
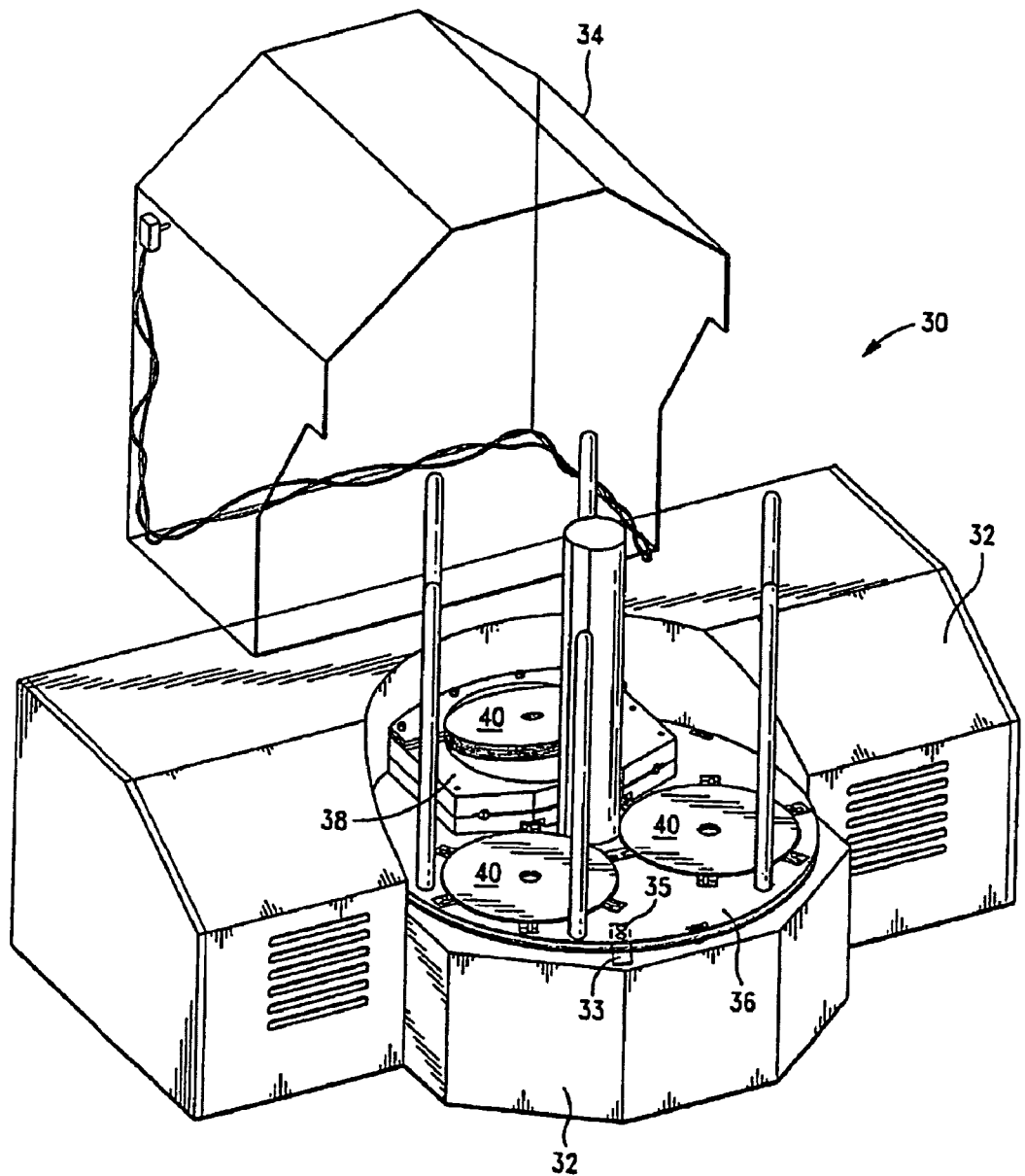
FIG. 1 shows an example perspective view of a disk duplication system.

FIG. 1 shows an example perspective view of a disk duplication system 30. The disk duplication system 30 includes a housing 32 with a cover 34, a turntable 36, and a disk dispenser 38. The turntable 36 includes several hoppers for feeding and accepting disks 40 (e.g., optical discs such as CD, DVD, Blue-ray, HD DVD). The turntable 36 can rotate to move the disks 40 along a particular path. In one implementation, the disk duplication system 30 includes a sensor 33 mounted on a portion of the housing 32, adjacent to the turntable 36.

The housing 32 encloses a recorder for writing data on disks (e.g., recording to CDs or DVDs). The disk dispenser 38 dispenses disks 40 into the recorder (described below with respect to FIGS. 3-5 and 7-9). When data writing is complete, the turntable 36 rotates and receives the written disk in a selected hopper. Further rotation of the turntable 36 enables the disk dispenser 38 to dispense another disk 40 into the recorder to repeat the data writing process.

In one implementation, the turntable 36 can include embedded magnets 35. The sensor 33 can detect the magnets 35, which allows the system to recognize when the turntable 36 is in a desired rotational position with respect to the housing 32.

In one implementation, the housing 32 encloses a CD printer for printing indicia on disk surfaces and the disk dispenser 38 dispenses disks to the CD printer. Alternatively, other devices which perform one or more functions on optical disks can be used.

Figure 2:
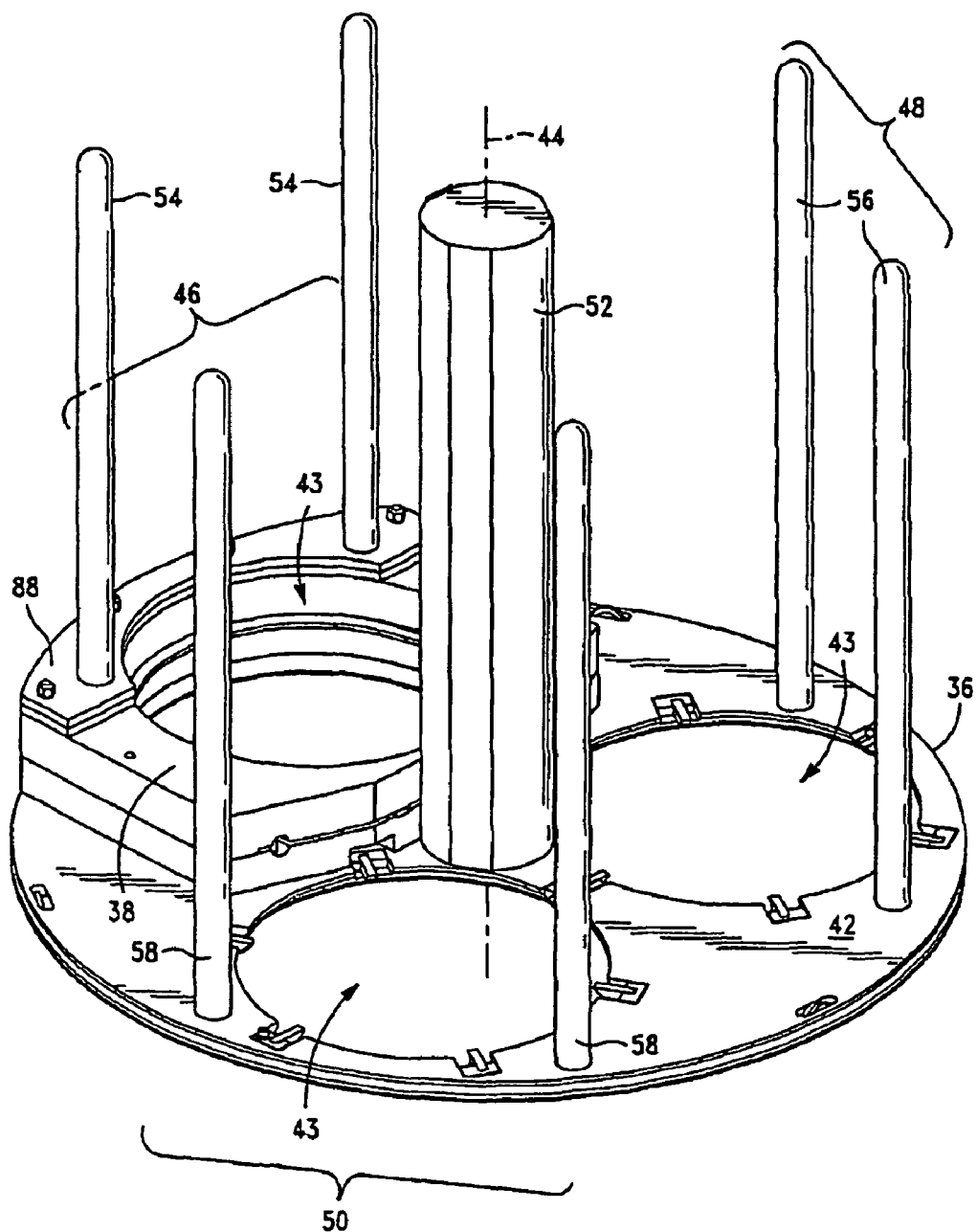
FIG. 2 shows an example perspective view of a turntable of FIG. 1.

FIG. 2 shows an example perspective view of the turntable 36. The turntable 36 includes a central post 52, and outer posts 54, 56, and 58. The turntable 36 also includes a surface 42 defining three openings 43 about a central axis 44. In one implementation, the turntable 36 can include a designated feed hopper 46 bound by outer posts 54, an accept hopper 48 bound by outer posts 56, and a reject hopper 50 bound by outer posts 58. The hoppers 46, 48, and 50 can substantially align with a respective opening 43 of the turntable 36 to dispense or receive disks through each respective opening.

In one implementation, the disk dispenser 38 is mounted on the turntable 36 substantially aligned with one opening 43 to dispense disks through the opening 43 of the turntable 36. The outer posts 54 cooperate with the central post 52 to define the feed hopper 46, which guides disks into the disk dispenser 38.

In one implementation, the central post 52 substantially aligns with the turntable axis 44. The outer posts 54, 56 and 58 can be positioned co-radially with respect to the turntable axis 44. The outer posts 56 and 58 can cooperate with the central post 52 to surround the respective turntable openings 43 and to define the reject hopper 48 and accept hopper 50, respectively.

Although outer posts 54, 56, and 58 cooperate with the central post 52 to define the hoppers 46, 48, and 50, the hoppers can have a number of different configurations. For example, in one implementation, a cylindrical wall can define one or more hoppers. In an alternative implementation, a helical coil, or by another structure (e.g., one having a lightweight design) can define the hopper.

Figure 3:
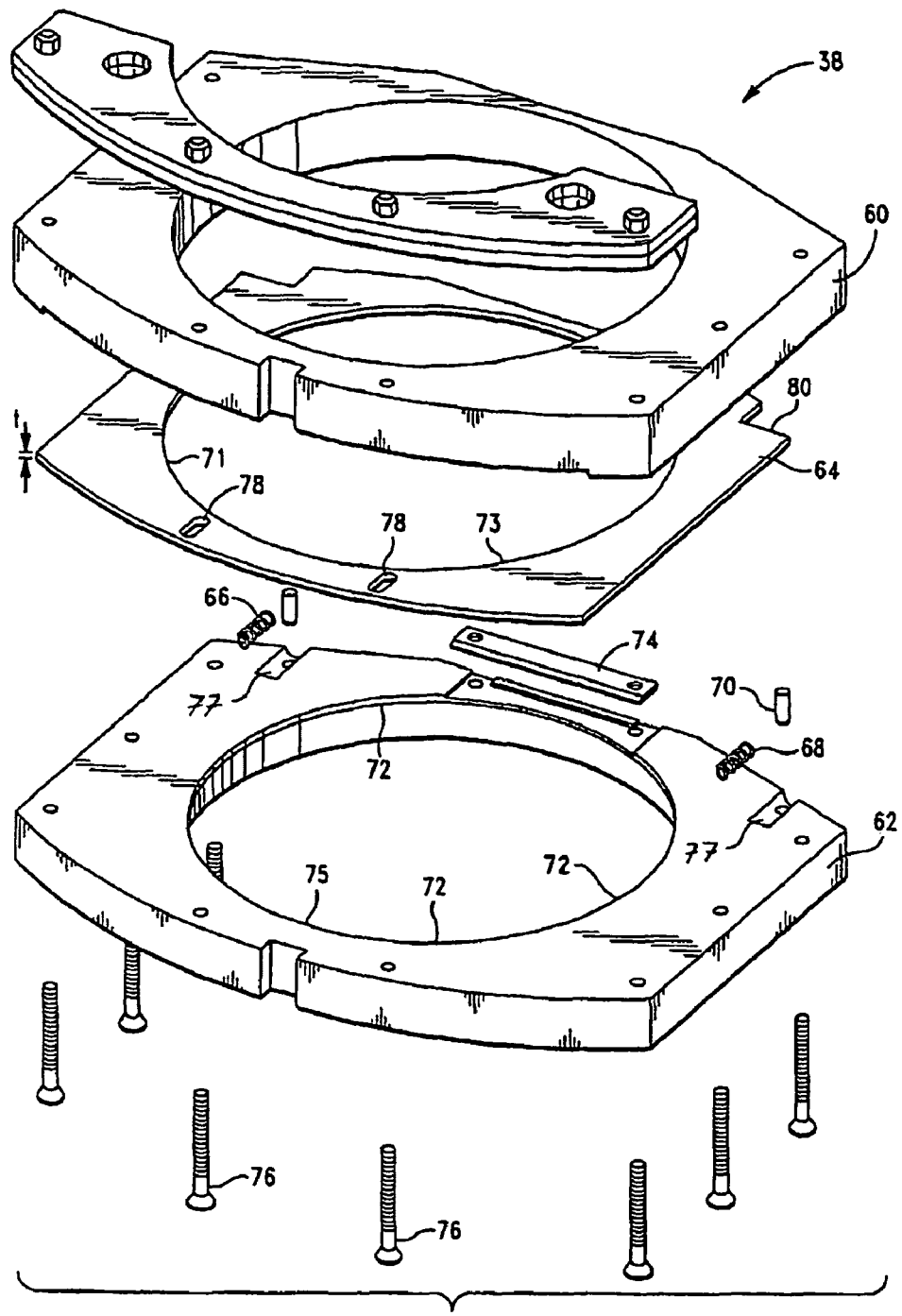
FIG. 3 shows an example exploded perspective view of a disk dispenser of FIG. 1.

FIG. 3 shows an example exploded perspective view of a disk dispenser 38. The disk dispenser 38 includes an upper guide 60, a lower guide 62, and a plate 64. The lower guide 62 includes springs 68, a rim 72, a support lip 74, an opposing edge 75, and fasteners 76. The plate 64 includes an arced edge 71. The arced edge 71 defines an inner periphery 73. The inner periphery 73 defines an opening for surrounding a disk. In one implementation, the inner periphery 73 is circular for substantially circumscribing a disk. The inner periphery 73 can be configured with a beveled edge for separating single disks from a stack of disks.

In one implementation, the upper guide 60, the lower guide 62, and the plate 64 each define a substantially circular opening, which allows a disk to pass through the disk dispenser 38. Each opening is sized for an appropriately sized disk to pass through when the disk is substantially parallel to the plate 64. The upper guide 60 and the lower guide 62 can be axially offset from each other so that a portion of the rim 72 of lower guide 62 stops disks, which may fall thorough the upper guide 60 towards the lower guide 62. The opposing edge 75 diametrically opposes the support lip 74. The support lip 74 cooperates with the opposing edge 75 to hold a disk on the lower guide 62. The plate 64 can be slidably mounted between the upper guide 60 and the lower guide 62 to selectively pass individual disks stopped by the lower guide 40 through the lower guide 62.

Pins 70 extend between the lower guide 62 and the upper guide 60 to retain the springs 68. The plate 64 can include a pair of holes 78, which align with respective fasteners 76. The fasteners 76 can extend through the upper guide 60, the plate 64, and the lower guide 62 to hold the upper guide 60 and the lower guide 62 together. The fasteners 76 retain the plate 64 between the upper guide 60 and the lower guide 62. In one implementation, the fasteners 76 align the plate 64 relative to the upper guide 60 and the lower guide 62 when the plate 64 slides.

The lower guide 62 includes a pair of grooves 77. The springs 68 can each be a coil spring each having a first and a second end. The springs 68 are positioned in the respective grooves 77. The pins 70 insert perpendicularly into respective recesses in the grooves 77. Accordingly, the first end of each spring 68 contacts one of the pins 70. Thus, the springs 68 bias the plate 64 in a desired position. In one implementation, the springs 68 offset the plate 64 from the lower guide 62 to enable the lower guide 62 to support a disk, and prevent disks from passing beyond the plate 64 when the plate 64 is in the bias position.

The plate 64 has an edge 80. The edge 80 contacts the second end of the spring 68. The spring 68 biases the plate 64 into a desired position relative to the lower guide 62. When the plate 64 slides towards the pin 70, the spring 68 dampens movement of the plate 64. In one implementation, the plate 64 has a substantially uniform thickness "t". The thickness "t" can substantially correspond to the thickness of an individual disk to be dispensed so that when the plate 64 slides, only one disk is dispensed.

Figure 4:
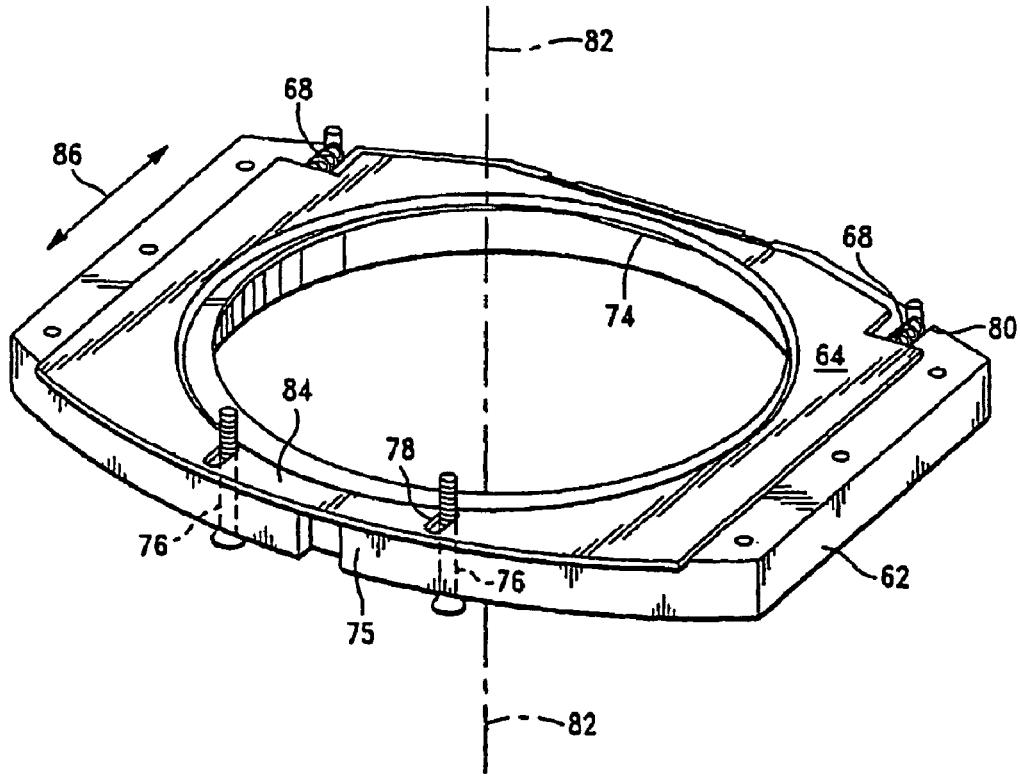
FIG. 4 shows an example perspective view of a portion of the disk dispenser of FIG. 3.

FIG. 4 shows an example perspective view of a portion of the disk dispenser 38. In particular, FIG. 4 shows the plate 64 and the lower guide 62 of the disk dispenser 38. In one implementation, the plate 64 reciprocates with respect to the lower guide in the direction of the arrows 86. The lower guide 62 opening defines an axis 82. The springs 68 can bias the plate 64 so that the plate opening is axially offset from the lower guide opening. In one implementation, offsetting the plate 64 opening from the lower guide 62 opening allows the support lip 74, in cooperation with the opposing edge 75, to hold a disk on the lower guide 62. The plate 64 substantially circumscribes a disk when the disk is on the lower guide 62. The plate 64 slides towards the springs 68, substantially aligning the opening of the plate 64 with the axis 82, to dispense a disk through the lower guide 62 opening. The springs 68 reciprocate the plate 64 back to the bias position offset from the lower guide 62.

Figure 5:
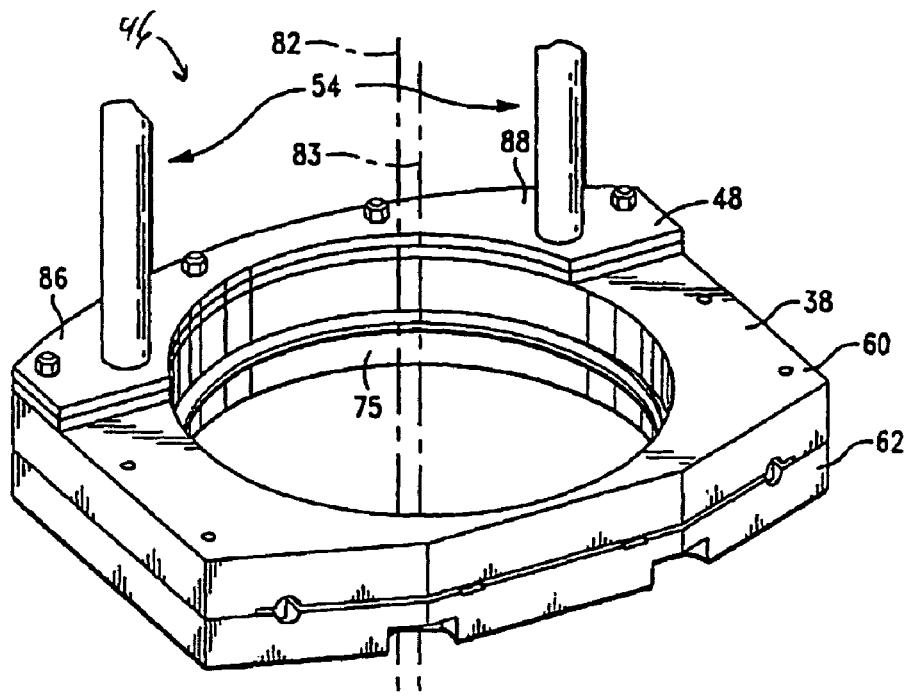
FIG. 5 shows an example perspective view of the disk dispenser of FIG. 3 with a portion of a feed hopper.

FIG. 5 shows an example perspective view of the disk dispenser 38 attached to the feed hopper 46. In one implementation, the feed hopper 46 includes a reinforcement plate 88, which attaches (e.g., with bolts) to the upper guide 60. The outer posts 54 can be mounted on the reinforcement plate 88. Accordingly, the feed hopper 46 attaches to the disk dispenser 38. The reinforcement plate 88 can provide support for the disk dispenser 38 and the feed hopper 46.

The upper guide 60 has an opening with an axis 83. The axis 82 of the lower guide 62 opening is axially offset from the axis 83 of the upper guide 60 opening.

FIG. 6 shows a cutaway rear perspective view of the disk duplication system. The housing 32 includes a motor 100, a mechanical linkage 102, an elevator pin 98, and an arm 104. The arm 104 and the elevator pin 98 can be connected using the mechanical linkage 102 to the motor 100. The motor 100 actuates the mechanical linkage 102 to cause the arm 104 to slide the plate 64 and to lift and lower the elevator pin 98. Movement of the linkage 102 and rotation of the turntable 36 dispense disks, one at a time, from the dispenser 38 onto the elevator pin 98. Movement of the linkage 102 can also insert disks, one at a time, through the opening 43 in the turntable 36 when the turntable 36 rotates. In an alternative implementation, the arm 104 and elevator pin 98 can be controlled independently. For example, the arm 104 can be operated by a separate motor. In one implementation, the arm 104 is an actuator operated by a servo motor.

In one implementation, the elevator pin 98 is a single unit. According to another implementation, the elevator pin 98 has multiple components, which extend and retract. In operation, the arm 104 can press against the plate 64 to slide the plate 64. Sliding the plate 64 relative to the upper guide 60 and the lower guide 62 causes the dispenser 38 to drop the disk 40 onto the elevator pin 98.

Figure 7:
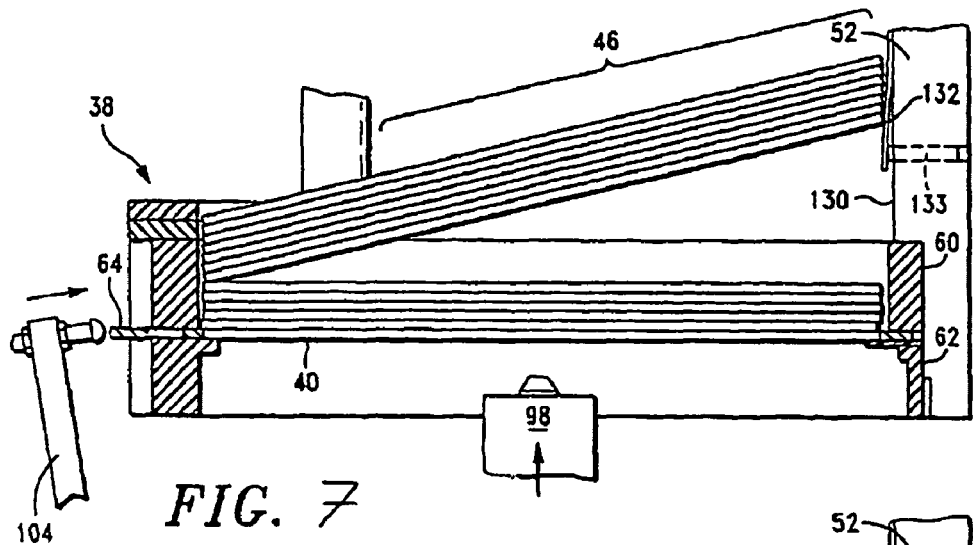
FIGS. 7-9 show an exemplary operation of a disk dispenser.
Figure 8:
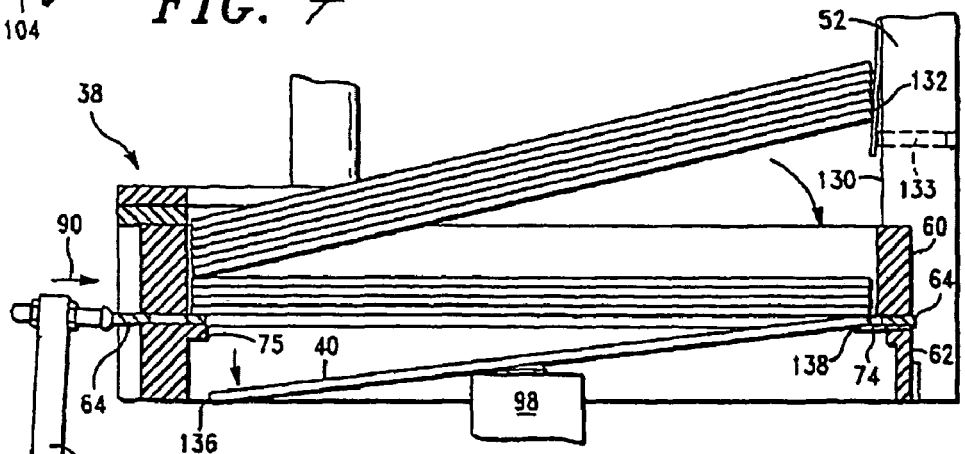
Figure 9:
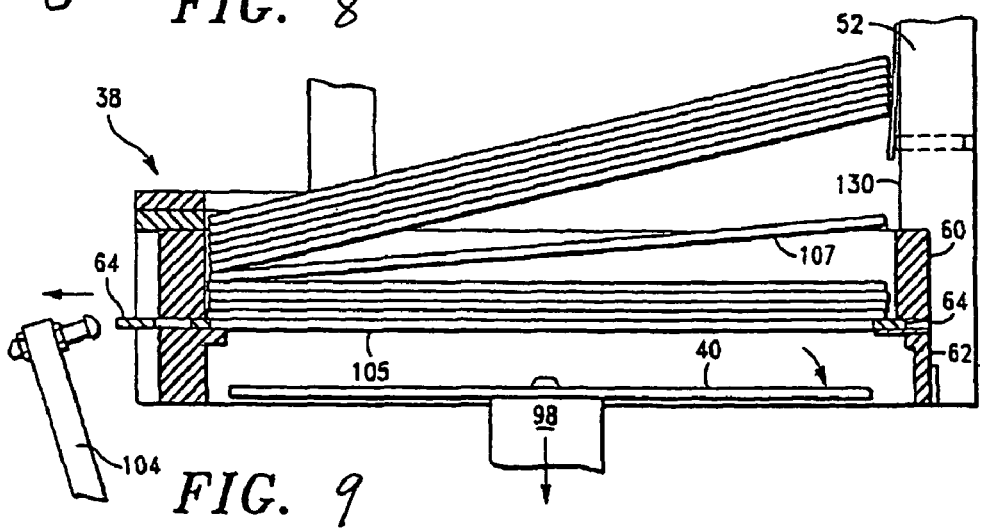

FIGS. 7-9 show an exemplary operation of a disk dispenser 38. In FIG. 7 the arm 104 is moving towards the plate 64. The support lip 74 and the opposing edge 75 of the lower guide 62 support the disk 40. In one implementation, the elevator pin 98 moves towards the dispenser 38 and the arm 104 moves towards the plate 64. Alternatively, in one implementation, the operation of the arm 104 is independent of the elevator pin 98. The upper guide 60 can hold from 4 to 6 disks in parallel with the plate while additional disks can be held in the hopper at an angle. For example, in one implementation, the three hoppers 46, 48, and 50 of the turntable 36 are each adapted to hold between 100 and 150 disks.

The central post 52 of the feed hopper 46 includes a recessed portion 130, an extended portion 132, and an adjustable set screw 133. The recessed portion 130 is adjacent the upper guide 60 to feed disks, in horizontal alignment with the plate 64, from the feed hopper 46 to the upper guide 60. In one implementation, the set screw 133 can rotatably extend through the central post 52 to adjust the distance at which the extended portion 132 extends from the central post 52 and insures proper feeding of disks from the feed hopper 46 to the upper guide 60.

The extended portion 132 angles disks stacked in the feed hopper 46 with respect to the plate 64. In one implementation, angling disks within the feed hopper 46 can reduce forces caused by disk weight on the disk dispenser 38, and particularly on the plate 64. Reducing the force on the disk dispenser 38 allows multiple disks to be stacked in the feed hopper 46.

FIG. 8 shows an operation of the disk dispenser 38 with the arm 104 contacting the plate 64. The disk 40 has two opposing edges 136 and 138. The arm 104 contacts the plate 64 to slide the plate 64 in the direction of the arrow 90. The plate 64 urges the edge 136 of the disk 40 off of the edge 75 of the lower guide 62. Reciprocation of the plate 64 urges the other edge 138 of the disk 40 off of the support lip 74 so that the disk 40 falls from the lower guide 60 (e.g., onto the elevator pin 98).

FIG. 9 shows an operation of the disk dispenser 38 with the arm 104 withdrawn from the plate 64. The plate 64 automatically reciprocates as the arm 104 withdraws. The plate 64 guides the next disk 105 onto the lower guide 62. Movement of the next disk 105 onto the lower guide 62 causes another disk 107 to fall from the hopper into the upper guide 60.

Figure 10:
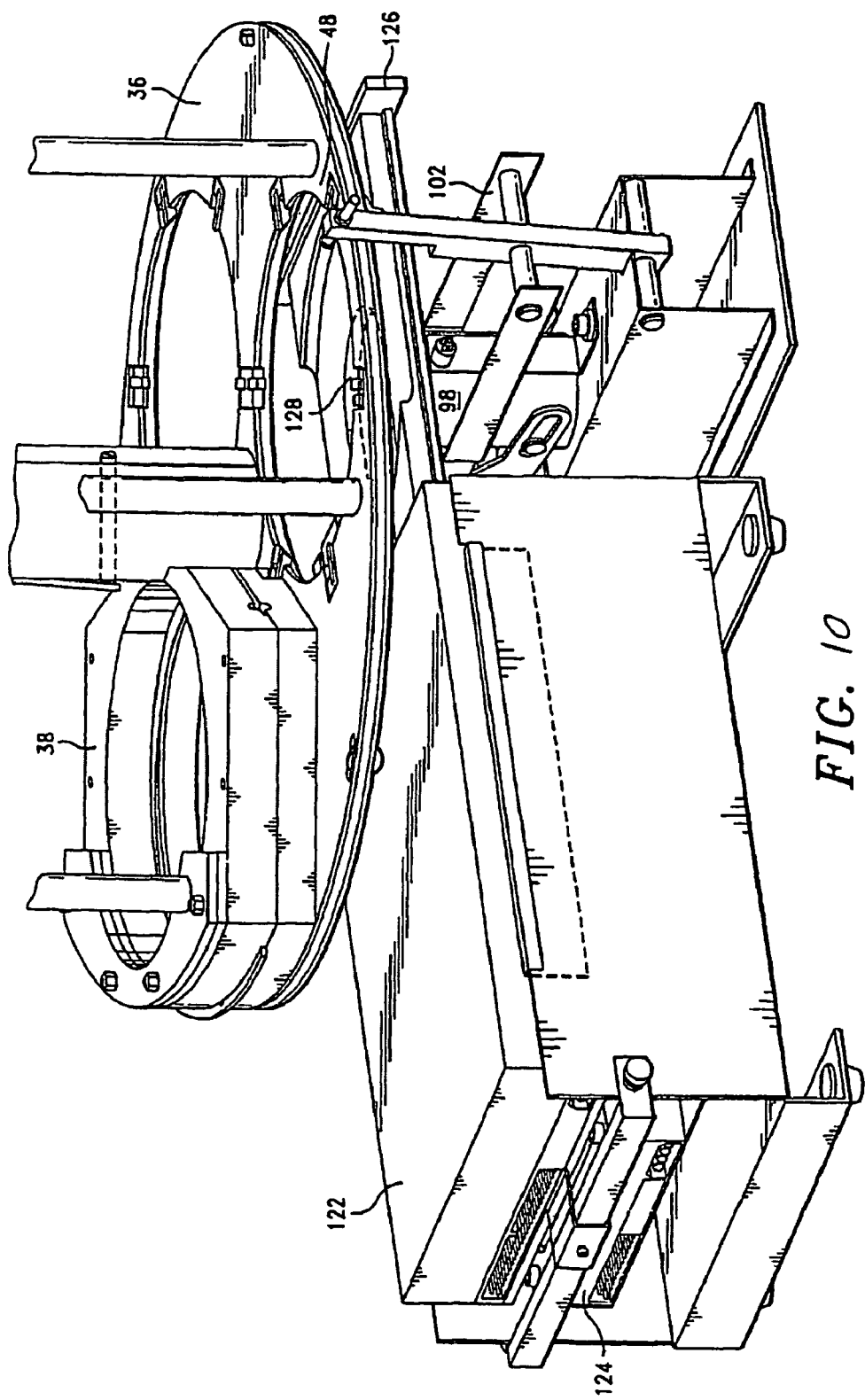
FIG. 10 shows an example perspective view of a disk recorder with the disk duplication system.

FIG. 10 shows an example perspective view of a disk recorder with a disk duplication system 180. The disk duplication system 180 includes the turntable 36, a recorder 122, a hard drive 124, the elevator pin 98, and the mechanical linkage 102. The recorder 122 includes a tray 126. The tray 126 automatically extends from the recorder 122 to interpose a disk between the elevator pin 98 and the turntable 36, or to catch a disk, which is dispensed from the disk dispenser 38.

In one implementation, the tray 126 includes an opening 128 that can allow the elevator pin 98 to extend through the turntable 36. The hard drive 124 can be coupled with the recorder 122 to deliver data to be written by the recorder 122. A controller including a circuit board within the housing regulates operation of the hard drive 124, the recorder 122, the linkage 102, and the turntable 36.

In one implementation, the recorder 122 is a CD Recorder, a DVD recorder, or the like. In another implementation, the housing 32 of FIG. 1 encloses the recorder 122, the hard drive 124, the pin 98, and the linkage 102. The recorder 122 in combination with the disk dispenser 38, turntable 36, and the elevator pin 98 can provide duplication of memory storage disks.

Figure 11:
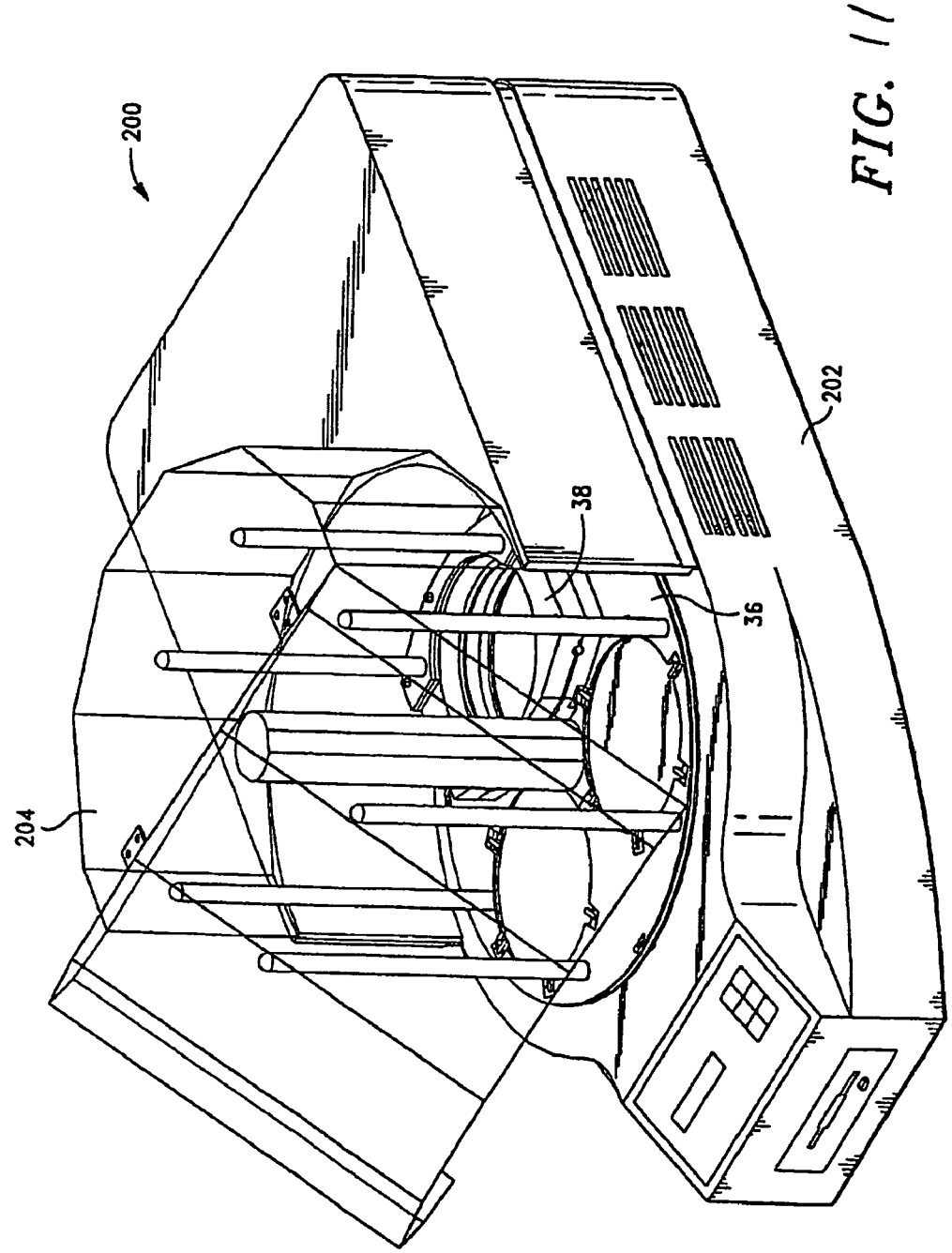
FIG. 11 shows an example disk duplicating and printing apparatus.

FIG. 11 shows a disk duplicating and printing apparatus 200. The disk duplicating and printing apparatus 200 includes a housing 202, which encloses a disk recorder and a disk printer. The disk duplicating and printing apparatus 200 includes a turntable 36 having a disk dispenser 38, and a cover 204.

In one implementation the cover 204 is split and includes hinges 206 to enable the cover 204 to open and close without requiring removal of the cover 204 from the housing. The cover 204 can be transparent to allow inspection of the disk duplicating and printing apparatus 200 during operation.

While the turntable and disk dispenser are shown in conjunction with a recorder and a printer, in other implementations, the turntable and dispenser can be used in any of a number of operations performed on memory storage disks, including cleaning, polishing, re-recording, packaging, and reading, etc.

Figure 12:
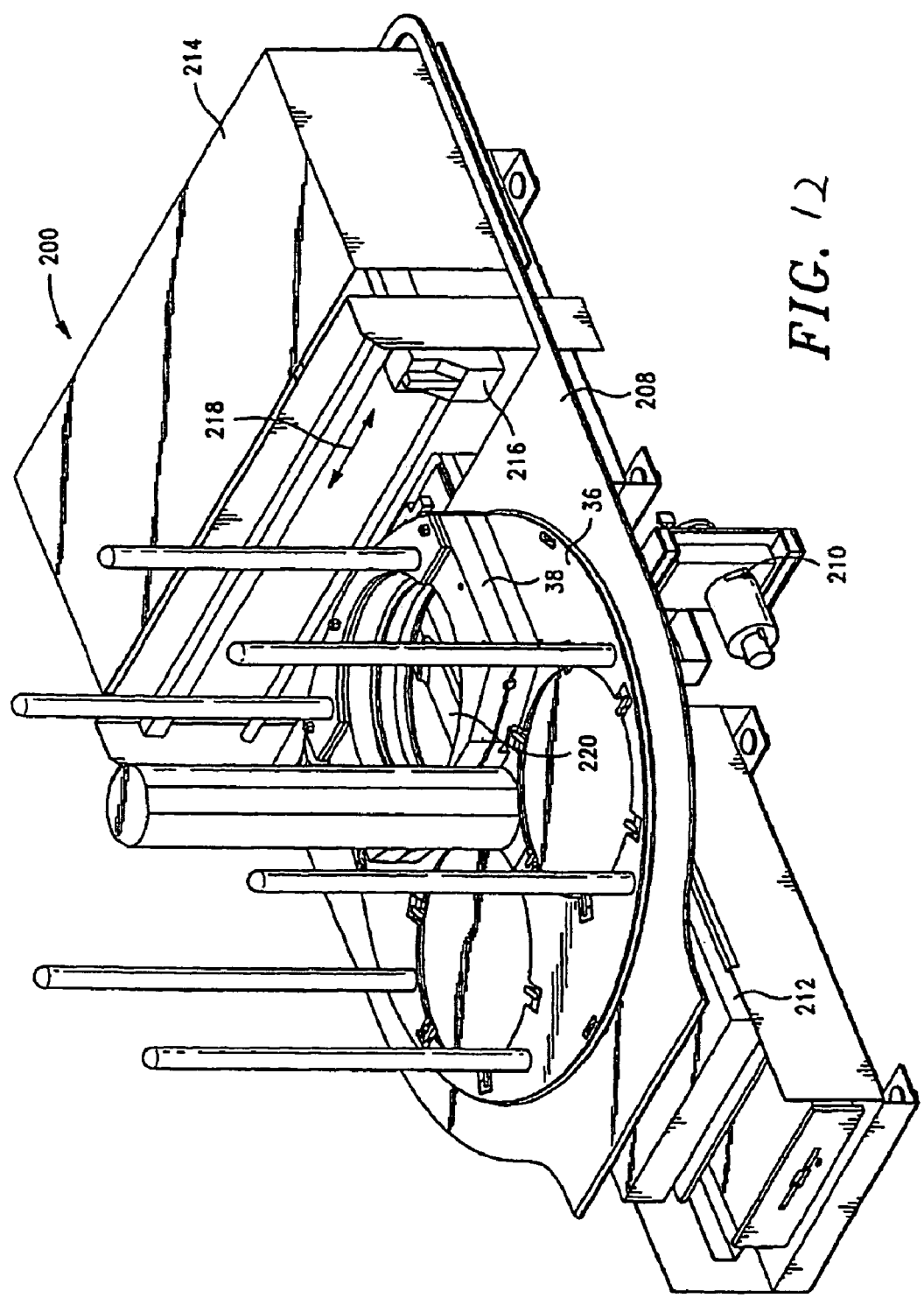
FIG. 12 shows an example perspective view of the disk duplicating and printing apparatus of FIG. 11.

FIG. 12 shows the disk duplicating and printing apparatus 200 having a frame 208, a motor 210, a disk recorder 212, and a disk printer 214. The disk recorder 212, disk printer 214, and motor 210 can be mounted on the frame 208. The motor 210 can rotate the turntable 36 to move disks between the turntable 36, the disk recorder 212, and the disk printer 214. The motor 210 can also actuate the disk dispenser 38. The printer 214 has a tray 220, which can extend and retract. The printer 214 also includes an ink jet cartridge 216, which reciprocates in the direction of the arrows 218 to enable the printer 214 to write on disk surfaces. In one implementation, the printer 218 is a SIGNATURE.® printer and the ink jet cartridge 216 reciprocates across a disk to print on the disk surface as the tray 220 extends.

Figure 13:
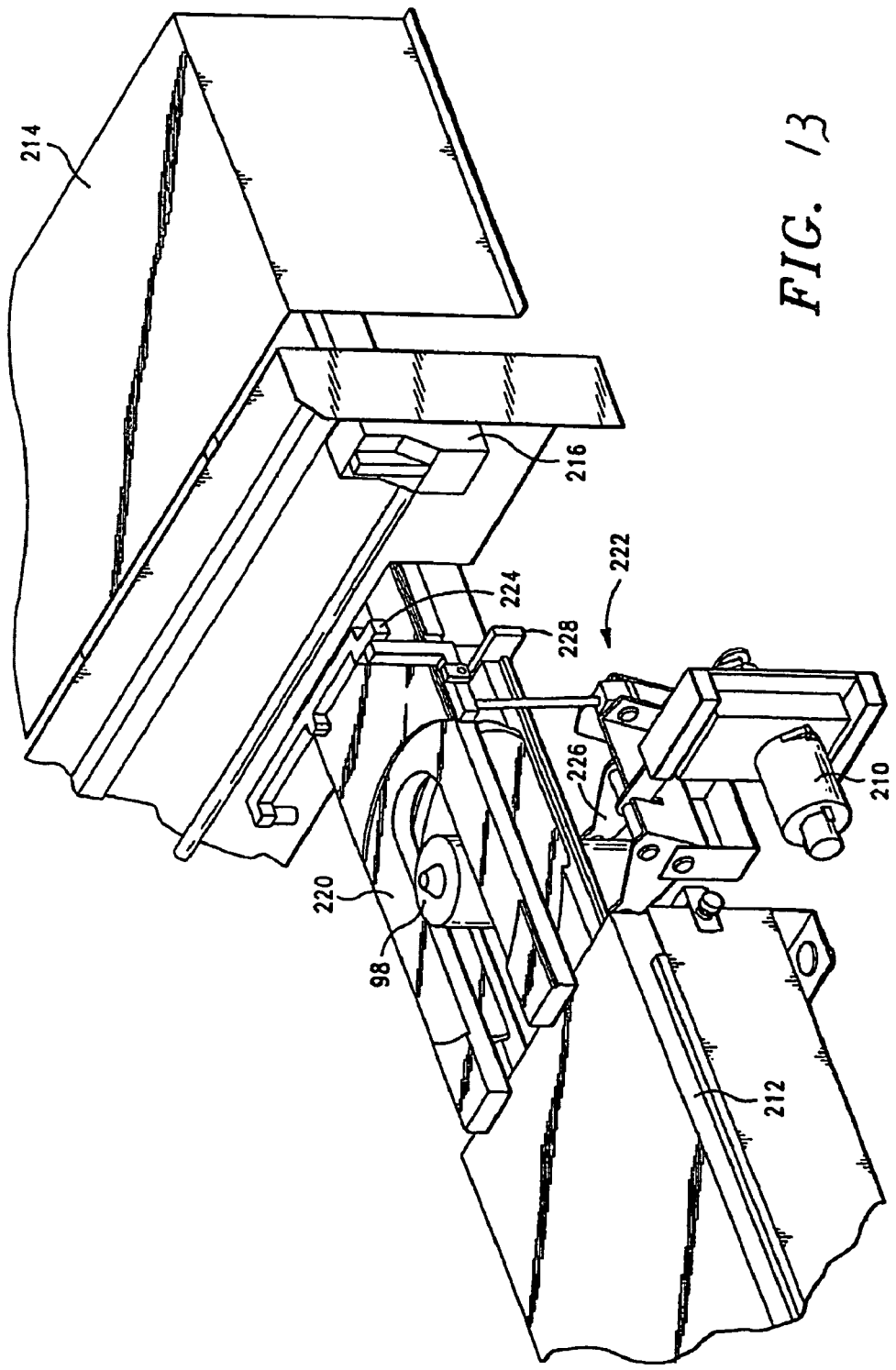
FIG. 13 shows an example perspective view of a writer tray with the disk recorder of FIG. 12.

FIG. 13 shows an example perspective view of a portion of the disk duplicating and printing apparatus 200 with a printer 214 and recorder 212. The disk duplicating and printing apparatus 200 includes the printer 214, the recorder 212, the motor 210, and an elevator pin linkage assembly 222. The elevator pin linkage assembly 222 includes a disk dispenser actuator 224 and an elevator pin actuator 226. The elevator pin linkage assembly 222 coordinates the operation of the elevator pin 98 and the disk dispenser actuator 224.

The elevator pin 98 can extend and retract. In one implementation, the recorder 212 includes a tray 228. The tray 228 includes a central opening to allow the elevator pin 98 to extend through. Additionally, in one implementation, a portion of the tray 220 is bifurcated to form a substantially U shaped opening. Bifurcation of at least a portion the tray 220 can allow the tray 220 to extend and retract when the elevator pin 98 is extended. Accordingly, the tray 220 can extend or retract independently of the relative position of the elevator pin 98.

The tray 220 of the printer 214 and the tray 228 of the recorder 212 oppose each other. Other configurations can be used. For example, in one implementation, the recorder trays and printer trays can radially align, or stack above an appropriately configured elevator pin.

Figure 14:
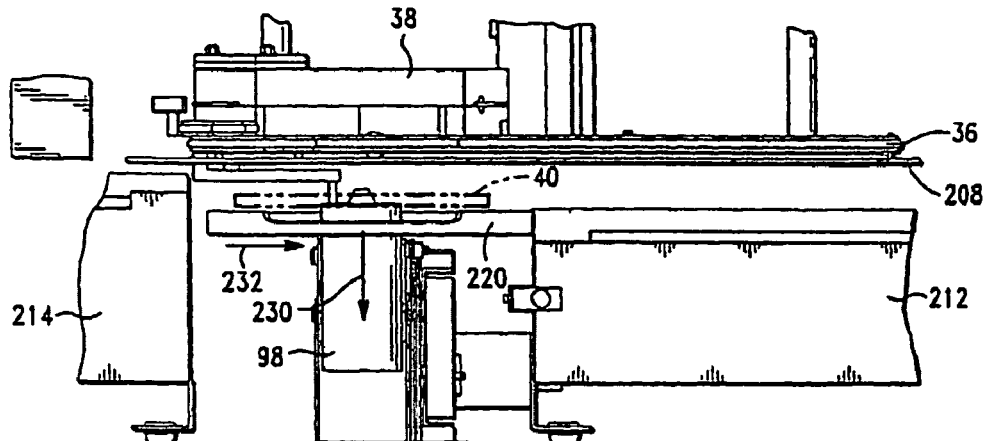
FIGS. 14-19 show a sequence of movement of the writer tray and printer tray of FIG. 13.

FIG. 14 shows the turntable 36 mounted on the frame 208. The recorder 212, the printer 214, and the elevator pin 98 can be mounted adjacent the turntable 36. The recorder tray 220 can extend fully. In one implementation, the elevator pin 98 extends through the recorder tray 220, towards the turntable 36. The disk dispenser 38 can dispense a disk 40 onto the elevator pin 98. The elevator pin 98 can retract in the direction of the arrow 230 to lower the disk 40 onto the recorder tray 220. In one implementation, the elevator pin 98 continues to retract to free the recorder tray 220 from interference with the elevator pin 98 allowing the recorder tray 220 to retract. After the disk 40 is positioned on the recorder tray 220, and the elevator 98 pin retracts, the recorder tray 220 can retract into the recorder 212, in the direction of the arrow 232, to record data on the disk 40. In one implementation, after data is recorded on the disk 40, the recorder tray 220 can extend to allow for removal of the disk 40.

Figure 15:
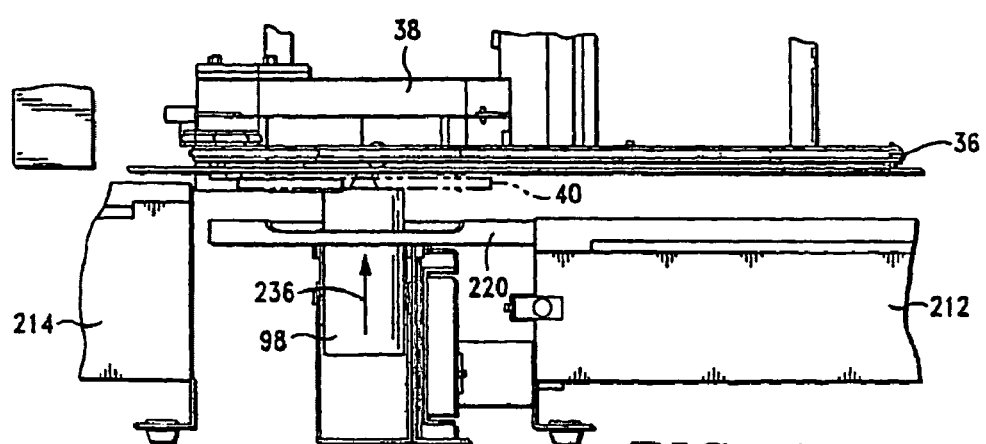

FIG. 15 shows the recorder tray 220 extended after the recorder 212 completes disk recording. In one implementation, the elevator pin 98 can extend through the tray 220, lifting the disk 40 from the tray 220, towards the turntable 36 in the direction of the arrow 236. Optionally, the next step is to print indicia on the disk 40.

Figure 16:
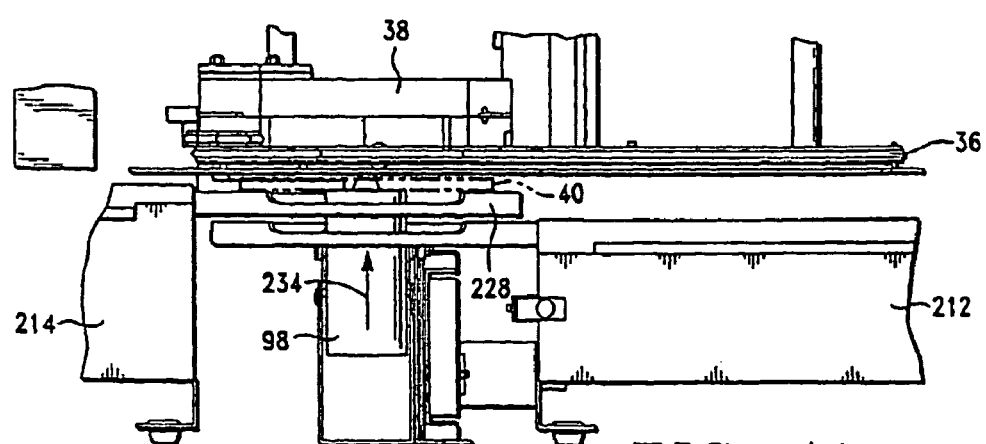

FIG. 16 shows the printer tray 228 extending. In one implementation, the printer tray 228 is bifurcated, having a substantially U shaped opening. Consequently, the printer tray 228 can move past the elevator pin 98 to adjacent the disk. The elevator pin 98 can then lower the disk 40 onto the printer tray 228 in the direction of the arrow 234.

Figure 17:
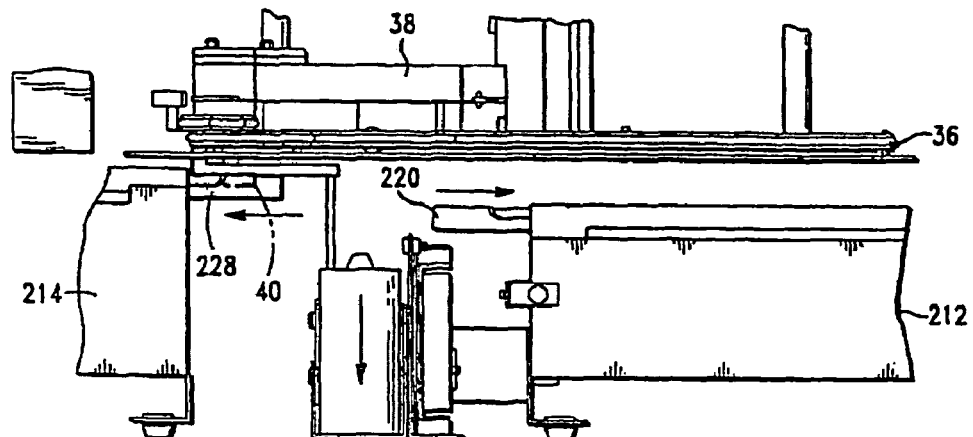

FIG. 17 shows the printer tray retracting. According to one implementation, the printer 214 can print on the disk 40 while the printer tray 228 retracts or after the printer tray 228 has retracted. According to another implementation, the printer 214 prints on the disk 40 when the printer tray 228 extends. In one implementation, the printer tray 228 can fully re-extend upon completion of printing.

Figure 18:
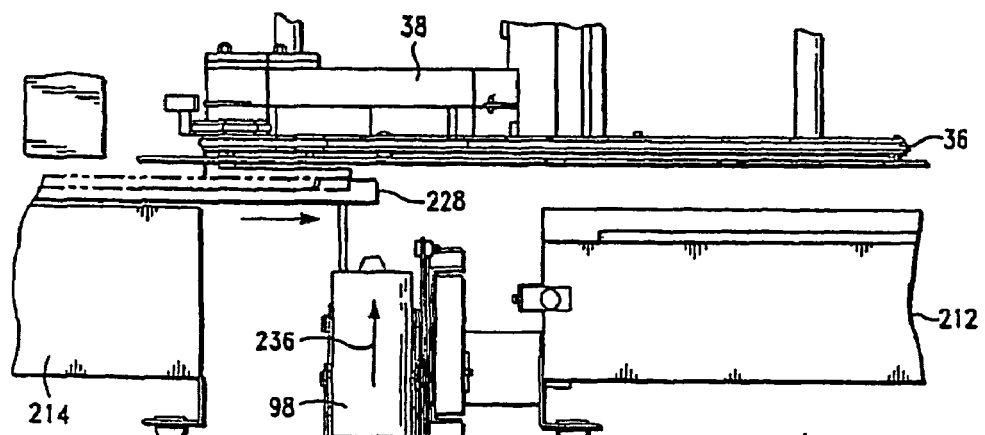

FIG. 18 shows the printer tray 228 extending towards a fully extended position. As the printer tray 228 extends, the turntable 36 rotates and the elevator pin 98 extends towards the turntable 36 in the direction of the arrow 236.

Figure 19:
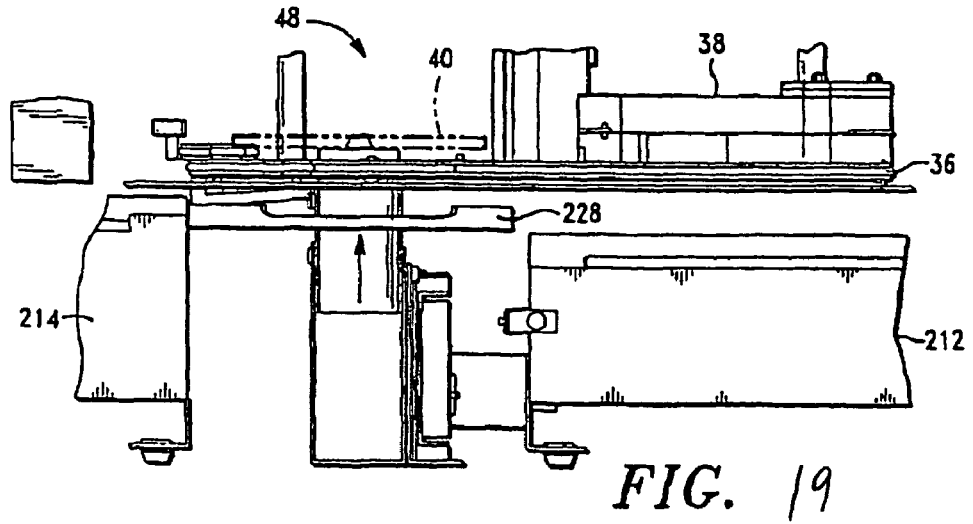

FIG. 19 shows the turntable 36 rotated to position the accept hopper 48 adjacent the elevator pin 98. The elevator pin 98 lifts the printed disk 40 from the printer tray 228. The elevator pin 98 lifts the printed disk 40 fully onto the turntable 36 into the accept hopper 48.

The turntable 36 rotates to position the disk dispenser 38 above the elevator pin 98, another disk 40 is dispensed, and the elevator pin 98 lowers the newly dispensed disk to the recorder 212 to repeat the sequence shown in FIGS. 14-19.

Figure 20:
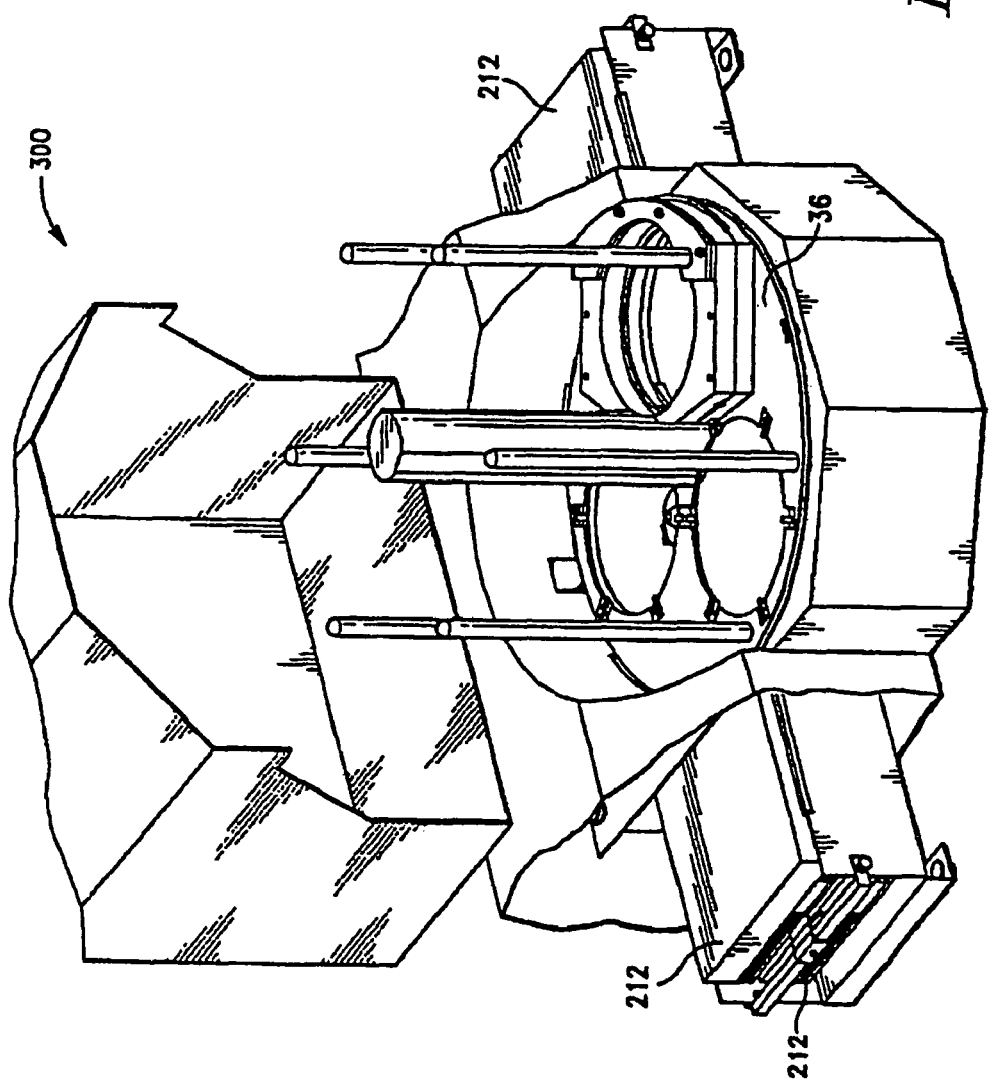
FIG. 20 shows an example partially cutaway perspective view of a disk handling system having multiple recorders.

FIG. 20 an example partially cutaway perspective view of disk handling system 300 having multiple recorders. The disk handling system 300 includes a turntable 36 and multiple disk recorders 212. In one implementation, the disk handling system 300 connects to a computer network, or to a stand-alone computer, using a standard connection such as a network card and cable, or a serial cable, respectively. Accordingly, data, which is to be duplicated, can be communicated to the disk handling system 300. The multiple disk recorders 212 can simultaneously write the data to disks held in two or more of the disk recorders 212. When the data is written, the disk handling system 300 can sequentially remove the disks from the disk recorders 212 and places the disks on the turntable 36.

The disk recorders 212 are one example of a workstation type. In other implementations, the disk recorders 212 can be replaced, for example, with disk printers, disk cleaners, disk surface testing devices, and other useful devices.

Figure 21:
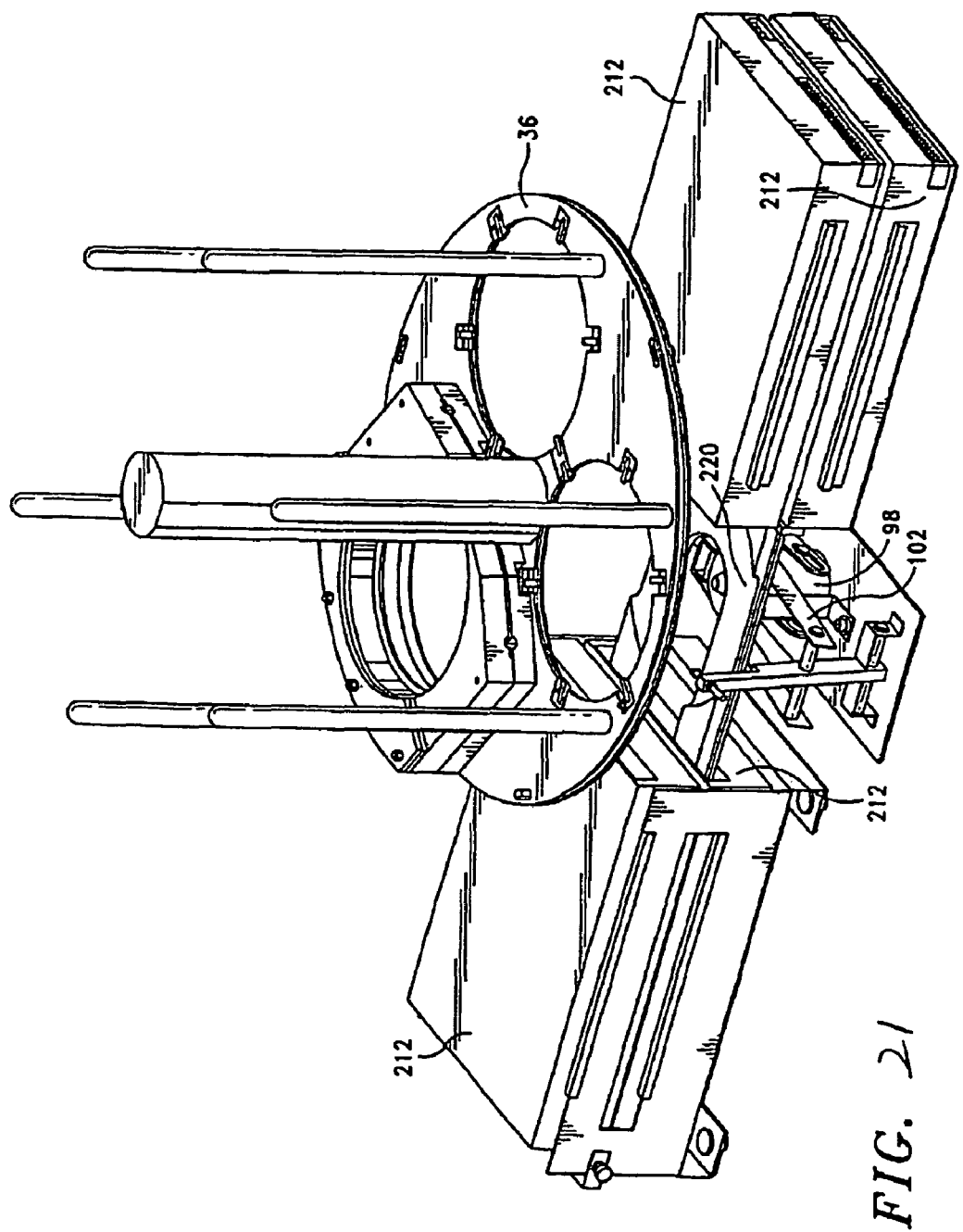
FIG. 21 shows an example perspective view of the turntable and multiple recorders of FIG. 20.

FIG. 21 shows the disk recorders 212, the turntable 36, the mechanical linkage 102, and the elevator pin 98 in one implementation of the disk handling system 300 of FIG. 21. The disk recorders 212 are stacked in two discrete stacks. The two stacks are positioned opposite each other. The elevator pin 98 is interposed between the opposing stacks so that the elevator pin 98 can move disks from either stack.

Figure 22:
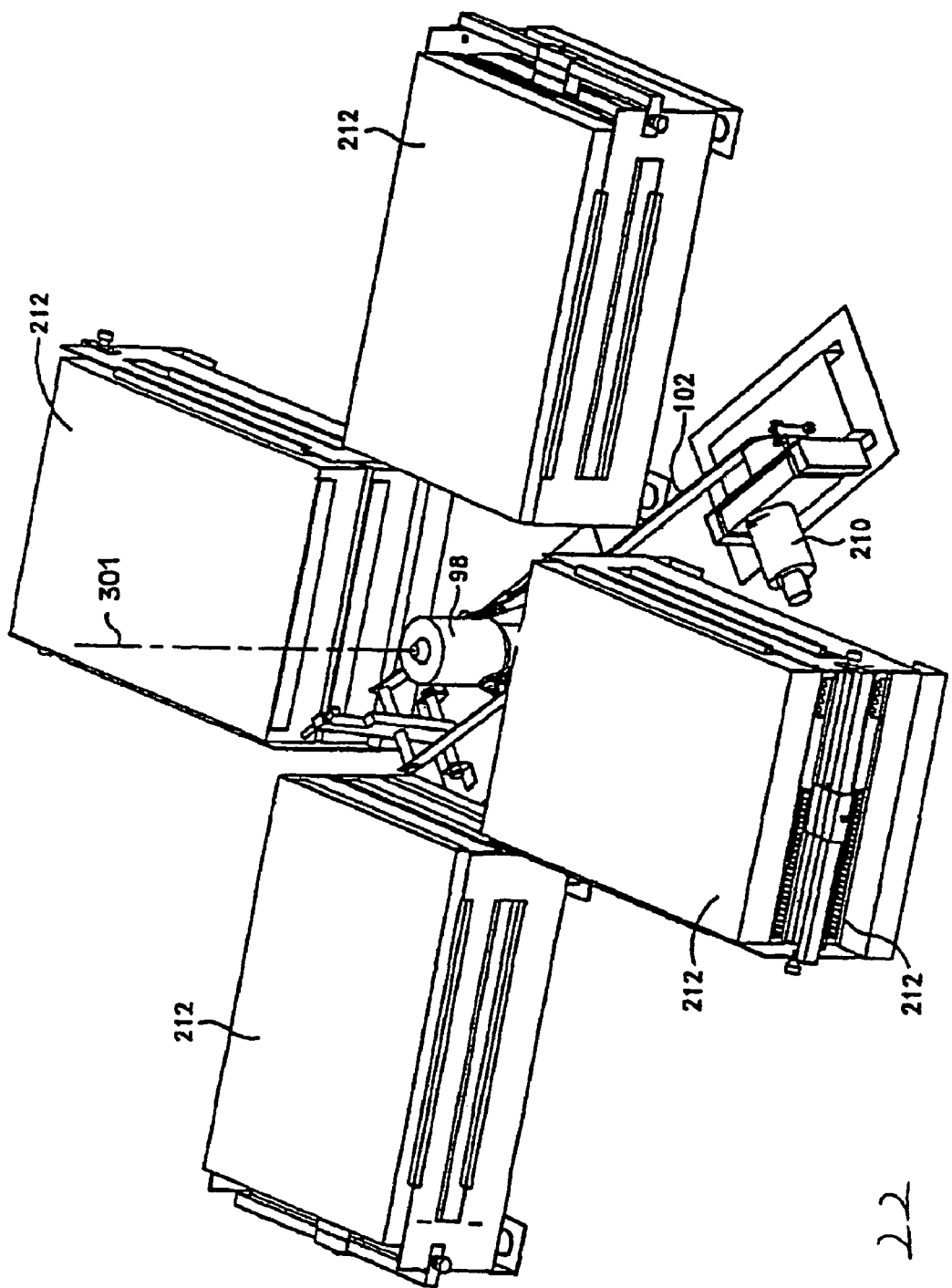
FIG. 22 shows an example perspective view of the turntable and multiple recorders stacked and aligned in a radial array.

FIG. 22 shows an example perspective view of an alternative implementation of turntable 36 and multiple recorders 212 of the disk handling system 300. The multiple recorders 212 are stacked and aligned in a radial array. The elevator pin 98 defines a central axis 301 and the disk recorders 212 stack in a radial array with respect to the central axis 301. The mechanical linkage 102 and elevator pin 98 are interposed centrally between the recorders 212. The elevator pin 98 can telescope to lift disks, at varying heights, from each of the stacked disk recorders 212.

Although, in one implementation, the elevator pin 98 aligns with the central axis 301, depending on relative position of the disk recorders 212 and the turntable, the elevator pin 98 can be positioned adjacent any of the disk recorders 212. According in one implementation, multiple elevator pins 98 can be used. In one implementation, the elevator pin 98 can be laterally moveable to lift disks from any of the disk recorders 212. Alternatively, the recorders 212 can be moveable, laterally for example, to enable the elevator pin 98 to lift disks from the recorders 212.

Figure 23:
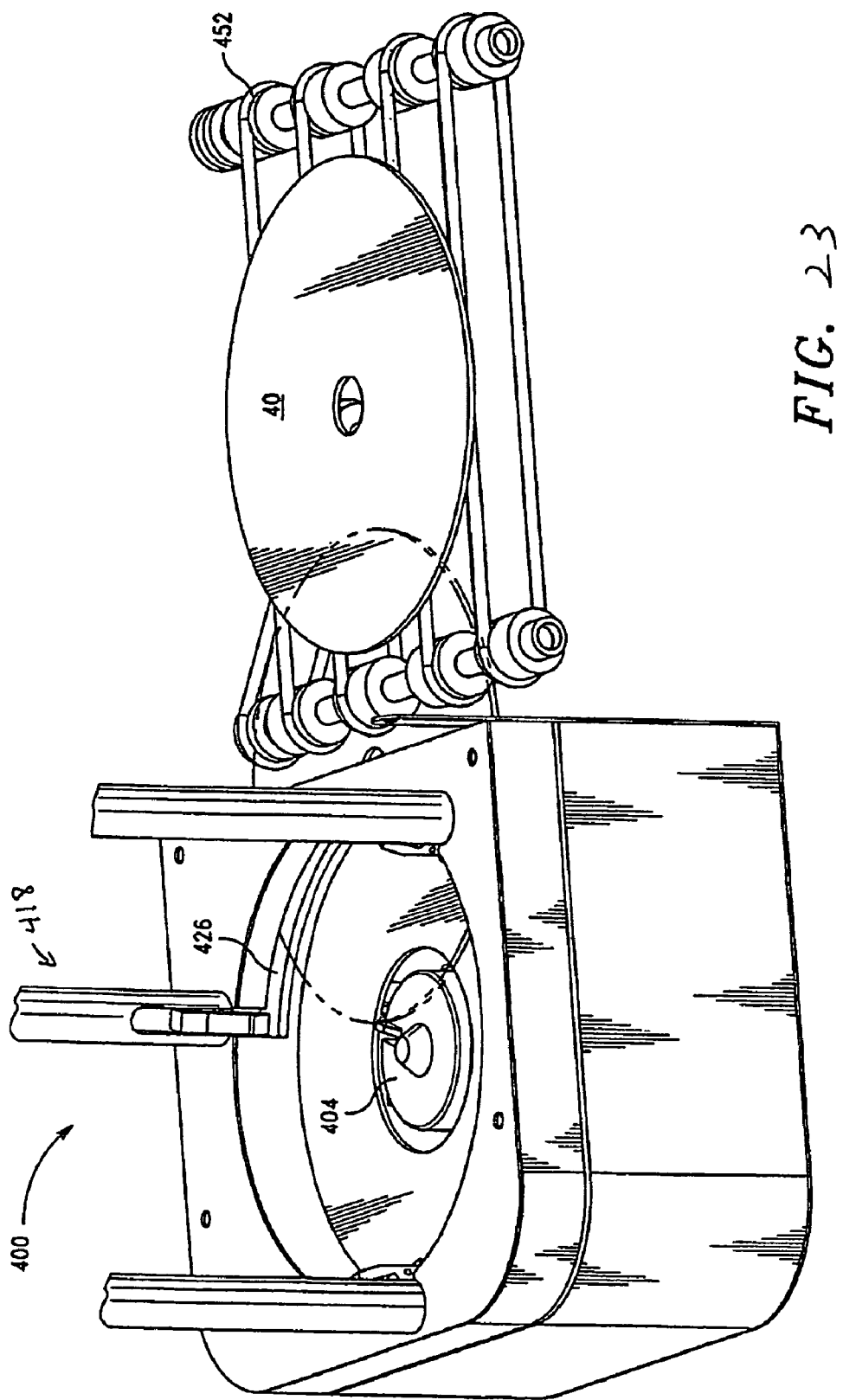
FIG. 23 shows an example conveyer feeding a disk into a hopper using a lateral opening in the hopper.

FIG. 23 shows a memory storage device handling system 400 including a conveyor 452. The conveyor 452 delivers disks 40 through the lateral opening 426. For example, in one implementation, the conveyer 452 includes a series of rollers joined by two or more bands. As the rollers rotate, the bands translate, causing the disk to laterally move. Accordingly, the conveyer 423 delivers a memory storage disk 40 to the memory storage device handling system 400 so that the elevator pin 404 can stack the delivered disk 40 in the hopper 418.

Figure 24:
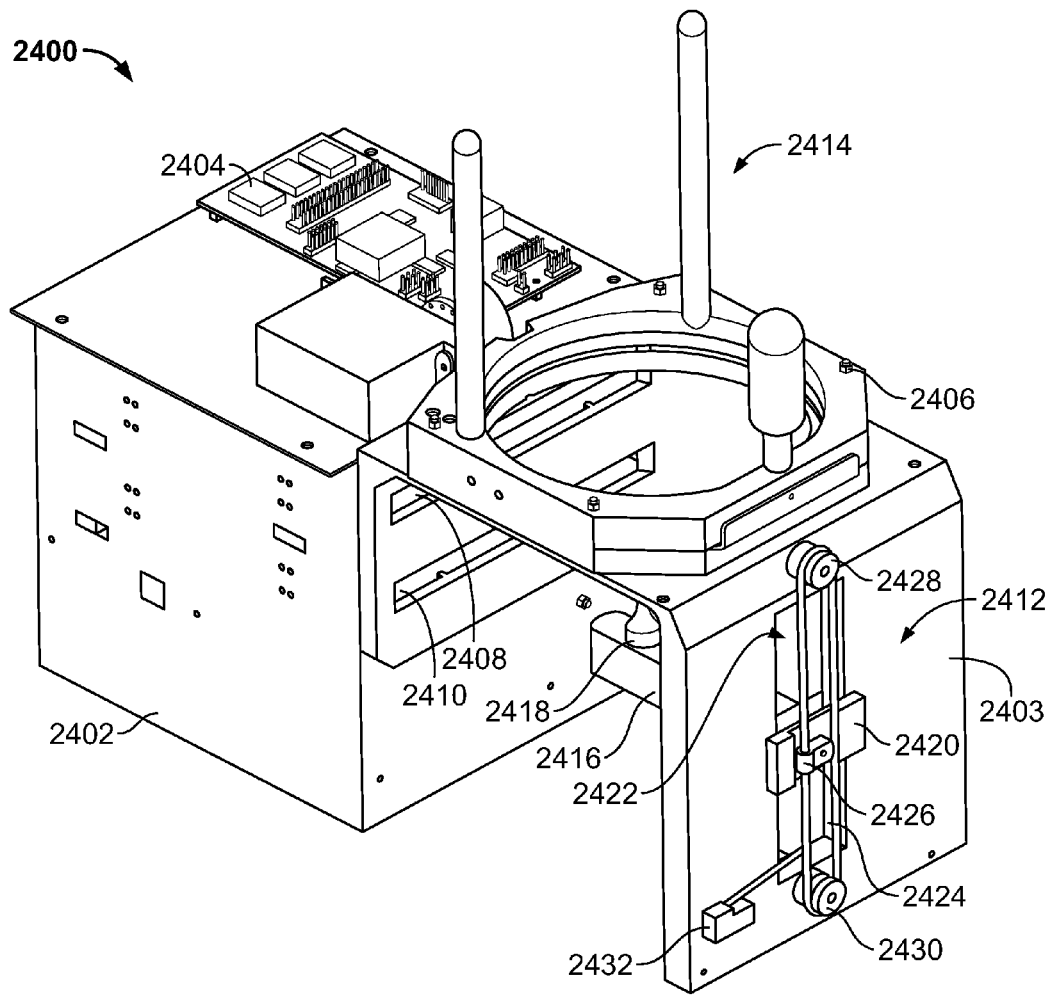
FIG. 24 shows an example disk handling system including an elevator system.

FIG. 24 shows an example disk handling system 2400. The disk handling system 2400 includes a housing 2402, controller 2404, dispenser 2406, optical drives 2408 and 2410, and elevator system 2412.

The housing 2402 can provide a frame for holding and positioning the various other components of the disk handling system 2400. In other implementations, different structures can be used to position the various components of the disk handling system 2400 relative to each other as well as to allow for additional components. Additionally, the housing 2402 can enclose components to protect the components from dust or other environmental conditions.

The dispenser 2406 can be used to provide single disks to the elevator systems 2412. In one implementation, the dispenser 2406 is similar to the dispenser described with respect to FIGS. 3-5. In another implementation, other dispensing devices can be used which, for example, can be configured to dispense a single disk at a time. In one implementation, a hopper 2414 is coupled to the dispenser 2406 and configured to hold a number of disks for dispensing, for example, as shown in FIGS. 2 and 5 above. Additionally, different mechanisms can be used to reciprocate the plate of the dispenser 2406. For example, a servo motor with an actuator for depressing the plate can be used to dispense disks from the dispenser 2406.

The controller 2404 can be used to coordinate operation of the dispenser 2406, optical drives 2408 and 2410, and the elevator system 2412. The controller 2404 can include, for example, control circuitry, or a combination of hardware and software components. In one implementation, the controller 2404 can be located externally or can receive commands from an external source. For example, the controller 2404 can control a motorized actuator in order to dispense a single disk. In another example, the controller 2404 can also control the vertical movement of the elevator system 2412 to load and unload disks. Additionally, in one implementation, the controller 2404 can control the extension and retraction of a disk tray for each optical drive 2408 and 2410 as well as control the recording, printing, or other operations performed by the optical drives 2408 and 2410.

The optical drives 2408 and 2410 include disk trays for receiving and expelling optical disks such as CDs or DVDs. In one implementation, the optical drives 2408 and 2410 are disk recorders configured to record data on optical media. In another implementation, one or more of the optical drive 2408 and 2410 can be printing or labeling devices (e.g., for printing labels on the disks). In another implementation, the optical drives 2408 and 2410 read data from optical media instead of, or in addition to, recording data. In an alternative implementation, a combination of reading, recording, and printing functionality can be provided by one or more of the optical drives 2408 and 2410. In one implementation, each optical drive 2408 and 2410 can receive or send data to other components, for example, to a storage device (e.g., a hard disk drive). For example, in one implementation, the storage device transmits data to the optical drives 2408 and 2410 for recording onto optical disks, respectively.

The elevator system 2412 is configured to move along an axis (e.g., vertically raise and lower) in order to transport individual disks among the dispenser 2406 and optical drives 2408 and 2410. The elevator system 2412 includes an arm 2416 having a distal end and a proximal end. A spindle 2418 is fixably attached to a top side of the arm along the distal end. The spindle 2418 is configured to balance an optical disk from a central aperture of each disk. Thus, the disk can be held by the spindle 2418 as the disk is raised or lowered by changing the vertical position of the arm 2416.

The proximal end of the arm 2416 is attached to a base 2420. The base 2420 is slidably attached to the housing wall 2403 within an aperture 2422 formed in the housing wall 2403. The aperture 2422 allows the base to move vertically within the housing wall 2403, thereby raising and lowering the arm 2416 relative to the housing 2402. In one implementation, the arm 2416 and base 2420 are part of a single component.

The axial movement of the arm 2416 is driven by a material such as a cable 2424, which is attached to the base 2420 with, for example, a fastener 2426. The cable 2424 is looped around two cylindrical drums 2428 and 2430 positioned vertically on opposite sides of the aperture 2422. In one implementation, the cylindrical drums 2428 and 2430 each include a groove for gripping the cable 2424. The grooves prevent the cable 2424 from sliding off the cylindrical drums 2428 and 2430 as well as providing traction for moving the cable 2424 coincident with the rotation of the cylindrical drums 2428 and 2430. In one implementation, the cable 2424 is polyurethane belting or other material that is flexible but substantially inelastic. In an alternative implementation, other structures can be used in place of, or in addition to, the cable 2424. For example, belts (e.g., timing belts), rack and pinion, chain and sprocket, or any other appropriate leverage lift structure can be used. For example, in a chain and sprocket structure, the cylindrical drums 2428 and 2430 can include respective sprockets for driving a chain looped around the cylindrical drums 2428 and 2430.

The cylindrical drum 2430 is rotationally driven by a motor 2432 (either directly or indirectly). The rotation of the cylindrical drum 2430 causes the cable 2424 to move, thereby raising or lowering the arm 2416. The motor 2432 receives control signals, for example from controller 2404, in order to rotate the cylindrical drum 2430 in one direction to lower the arm 2416 and in the opposite direction to raise the arm 2416. Additionally, the control signals to the motor 2432 control proper stopping points for the arm 2416 (e.g., to load/unload disks).

In one implementation, the disk handling system 2400 can include a conveyer, not shown, for unloading (or loading) optical disks from the disk handling system 2400. For example, the conveyer can be positioned below the optical drives 2408 and 2410 of the disk handling system 2400 such that the arm 2416 can be lowered to unload an optical disk on the spindle 2418. In one implementation, the conveyer includes a series of rollers including two or more bands, where each band loops two or more of the rollers, forming a substantially horizontal portion between the rollers. The rotation of the rollers causes the bands to rotate in a loop, such that the disk moves laterally along the top of the bands (for example, as shown in FIG. 23 above).

In another implementation, the conveyer includes a series of closely positioned rollers including a spacing allowing the arm 2416 to lower between a pair of rollers such that the rollers lift an optical disk from the spindle 2418. The rollers can be driven by one or more motors to laterally move an unloaded disk from the disk handling system 2400 to, for example, an output hopper. Alternatively, the rollers can be sloped such that the disk translates laterally away from the disk handling system according to gravity.

In one implementation, the conveyer can be used to transport unloaded disks to a printing device coupled to, or part of, the disk handling system. For example, the conveyer can directly feed disks into the printer device such that each disk, once unloaded from the elevator system, is fed into the printer device. The printer device can then print to the disk (e.g., print a label on the disk) and output the printed disk.

Figure 25A:
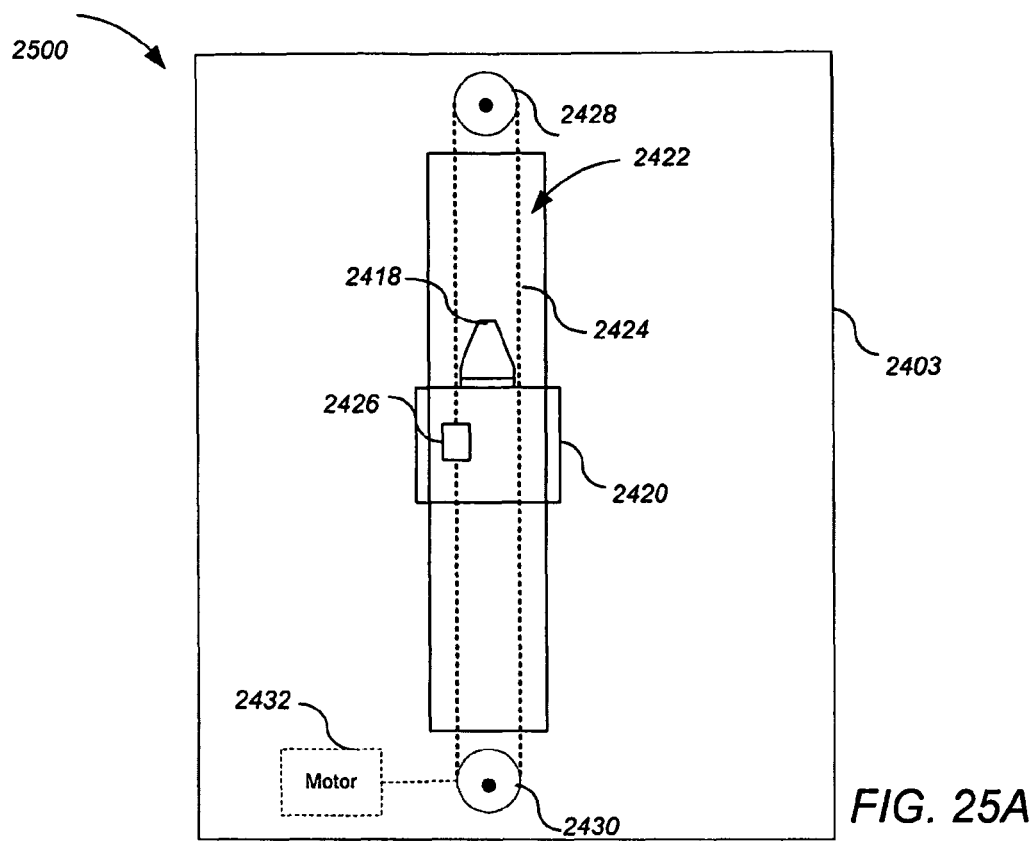
FIG. 25A shows an example front view of an elevator system of the disk handling system of FIG. 24.

FIGS. 25A, B, and C show a front view 2500, side view 2502, and top view 2504, respectively, of the elevator system 2412 for the disk handling system 2400 of FIG. 24. The front view 2500 shown in FIG. 25A is shown from the exterior of the disk handling system 2400 toward the aperture 2422. The front view shows the vertical path provided by the aperture 2422, within which the base 2420 can move. The movement of the base 2420 within the aperture 2422 is driven by the cable 2424 which moves as a result of rotation of the cylindrical drum 2430 powered by motor 2432.

Figure 25B:
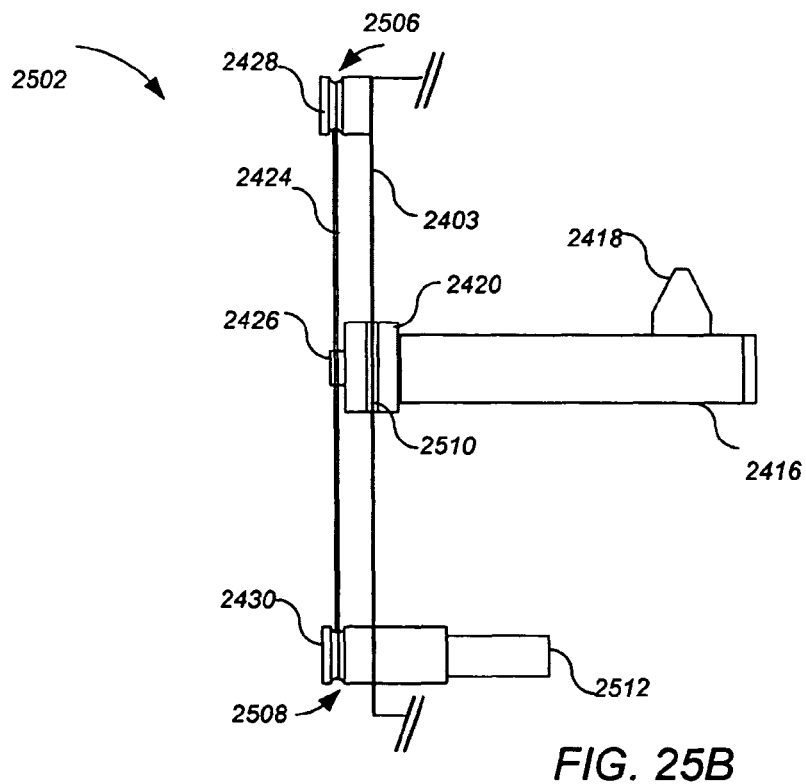
FIG. 25B shows an example side view of the elevator system of the disk handling system of FIG. 24.

FIG. 25B shows the side view 2502 of the elevator system 2412. FIG. 25B shows the extension of the arm 2416 from the base 2420. In one implementation, the arm 2416 has a length such that the distance from the center of the spindle 2418 to the base 2420 is substantially equal to at least the radius of a disk to be transported by the elevator system 2412. The side view 2502 also shows a notch 2510 in the base 2420 for holding the base 2420 within the aperture 2424. The housing wall 2403 fits within the notch 2510 to prevent motion of the base perpendicular to the plane of the housing wall 2403. Thus, the notch 2510 and housing wall 2403 in combination restrain the movement of the base in a vertical plane. Additionally, the notch 2510 supports the arm 2416, preventing the arm 2416 from tilting.

The side view 2502 of the elevator 2412 also illustrates grooves 2506 and 2508 in cylindrical drums 2428 and 2430, respectively. The grooves 2506 and 2508 hold the cable 2424 in the correct alignment as well as provide traction for translating the cable 2424 as the cylindrical drum 2430 rotates. In one implementation, the grooves 2506 and 2508 include teeth or other structures for griping the cable 2424. In one implementation, the cylindrical drum 2430 is coupled to a drive shaft 2512 for rotating the cylindrical drum 2430 using the motor 2432.

Figure 25C:
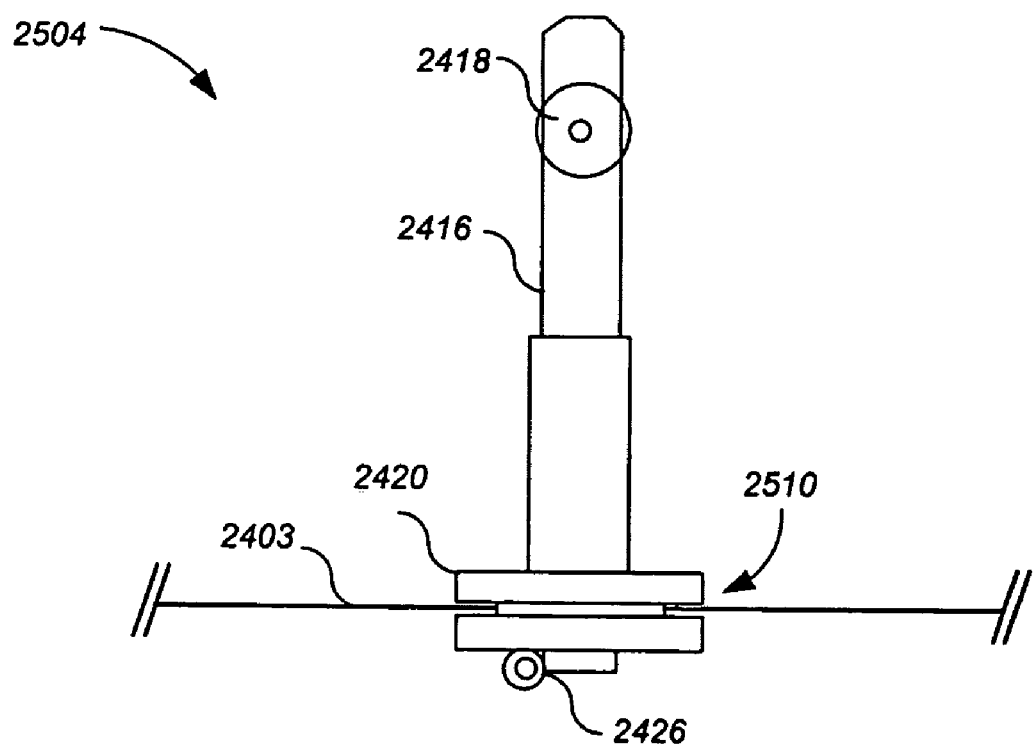
FIG. 25C shows an example top view of the elevator system of the disk handling system of FIG. 24.

FIG. 25C shows the top view 2504 of the elevator system 2412. FIG. 25C shows the elevator system 2412 from another perspective. As with the side view 2502, the top view 2504 clearly illustrates the notch 2510 positioned on each side of the base 2420 for positioning the base 2420 within the aperture 2422. Additionally, in FIG. 25C, one implementation of the fastener 2426 is shown. The fastener 2426 includes a loop for encircling the cable 2424, thus joining the base 2420 to the cable 2424 allowing the arm 2416 to raise and lower corresponding to the movement of the cable 2424.

Figure 26:
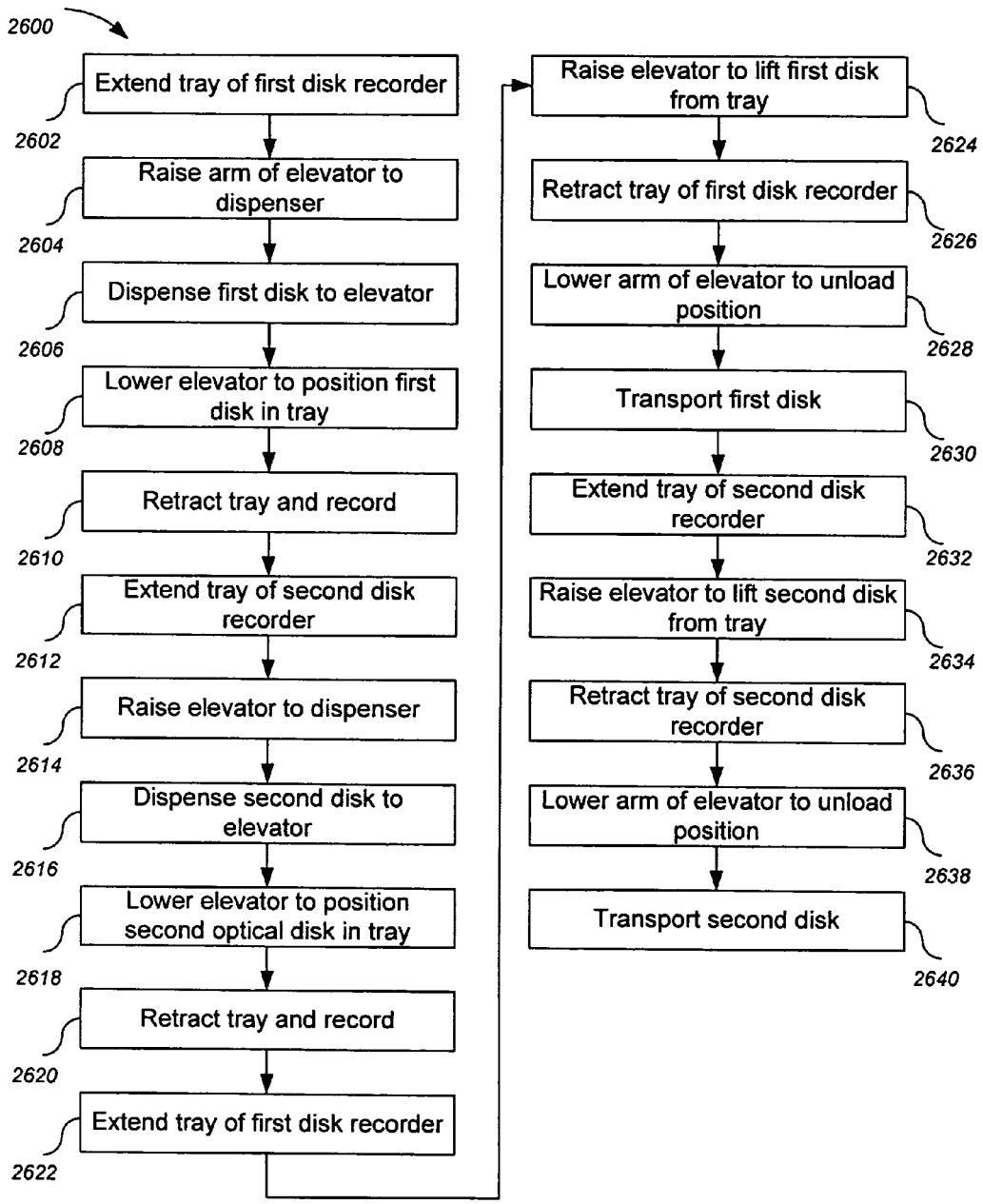
FIG. 26 shows an example process for using the disk handling system.

FIG. 26 shows an example process 2600 for controlling a disk handling system. For convenience, the process describes a single operational cycle with respect to a controller (e.g., controller 2404) that controls the disk handling system 2400 of FIG. 24. However other uses are possible, including uses in other types of disk handling systems, (for example, disk handling systems having other configurations such as different numbers or types (e.g., printing drives) of optical drives and dispensers).

The controller extends a tray of a first disk recorder (e.g., disk recorder 2408) (step 2602). In one implementation, the tray is bifurcated to form a substantially U-shaped opening such that an arm of the elevator system (e.g., arm 2416 of elevator system 2412) can pass through the tray when extended. The controller raises (e.g., moving along an axis in a first direction) the arm of the elevator system to the dispenser (e.g., dispenser 2406) (step 2604). The controller can raise the arm, for example, by sending a signal to a motor (e.g., motor 2432), which drives a structure for vertically raising or lowering the arm (e.g., the cylindrical drums 2428 and 2430 and cable 2424).

The dispenser dispenses a first disk to the arm of the elevator system (step 2606). The disk can include, for example, a CD, a DVD, or other optical media. In one implementation, the controller controls operation of the dispenser such that a single disk is dispensed. In one implementation, the arm includes a spindle (e.g., spindle 2418) centered beneath the dispenser such that the spindle holds the dispensed disk by a central aperture of the disk.

The controller lowers the arm of the elevator system (e.g., moving along an axis in a second direction) to position the first disk in the extended tray of the first disk recorder (step 2608). In one implementation, the arm is lowered such that the tray holds the first disk as the spindle lowers beneath the tray, such that the spindle is clear of the first disk. Thus, in effect, the tray lifts the disk from the spindle by holding the disk as the arm continues to lower. The controller then retracts the tray, containing the first disk, into the first disk recorder and begins recording data to the first disk (step 2610).

The controller extends a tray of a second disk recorder (e.g., disk recorder 2410) (step 2612). The controller then raises the arm of the elevator system back to the dispenser (step 2614). The dispenser can then dispense a second disk to the elevator system (step 2616).

The controller lowers the arm of the elevator system to position the second disk in the extended tray of the second disk recorder (step 2618). In one implementation, the arm is lowered such that the tray holds the second disk as the spindle lowers beneath the tray, such that the spindle is clear of the second disk. The controller then retracts the tray, containing the second disk, into the second disk recorder and begins recording data to the second disk (step 2620).

When the first disk recorder has completed recording to the first disk, the controller extends the tray (step 2622). The controller raises the arm of the elevator system to lift the first disk from the tray of the first recorder (step 2624). In one implementation, the spindle of the arm is positioned in the central aperture of the first disk, holding the disk in place as the arm raises, lifting the disk from the tray. In one implementation, the arm is lifted beyond the tray such that the arm is clear of the tray. The controller then retracts the tray of the first recorder (step 2626).

After the tray has retracted, the arm of the elevator system lowers, while holding the first disk, to an unload position (step 2628). In one implementation, the unload position is a conveyer to which the first disk can be unloaded. For example, the arm can pass beneath portions of the conveyer such that the conveyer effectively lifts the first disk from the spindle. The first disk is transported from the disk handling system (step 2630). In one implementation, once the first disk is free from the spindle, the conveyer slides the first disk laterally from the disk handling system.

When the second disk recorder has completed recording to the second disk, the controller extends the tray (step 2632). The controller raises the arm of the elevator system to lift the second disk from the tray of the second recorder (step 2634). In one implementation, the spindle of the arm is positioned in the central aperture of the second disk, holding the second disk in place as the arm raises, lifting the second disk from the tray. In one implementation, the arm is lifted beyond the tray such that the arm is clear of the tray. The controller then retracts the tray of the second recorder (step 2636).

After the tray retracts, the arm of the elevator system lowers, while holding the second disk, to an unload position (step 2638). In one implementation, the unload position is a conveyer to which the second disk can be unloaded. The second disk is transported from the disk handling system (step 2640) (e.g., using the conveyer). In one implementation, the second disk is fed into another device, for example a printing device, by the conveyer after being unloaded from the elevator system.

Steps of the process 2600 can be performed in a different order. For example, the disk can be dispensed to the arm of the elevator system prior to extending a tray from a disk recorder. Additionally, if additional disks are to be recorded, a next optical disk can be dispensed and loaded into the tray of the first disk recorder prior to unloading the second optical disk from the second disk recorder.

The elevator system can be used in disk handling systems having different configurations then shown above. For example, in one implementation, the disk handling system includes additional optical drives in a stack. The optical drives can perform recording, reading, printing or other functions. The elevator system can transport dispensed disks to any number of the optical drives continuously depending on the number of drives and the length of time required by individual drives to perform operations (e.g., a recording time for a particular disk recorder). Additionally, in another implementation, the elevator system can load and unload optical disks from multiple stacks of optical drives. The elevator system can be scaled to large stacks of drives by extending the length of the elevator system. For example, the aperture can be extended and a cable selected to accommodate the particular distance between the cylindrical drums.

Figure 27:
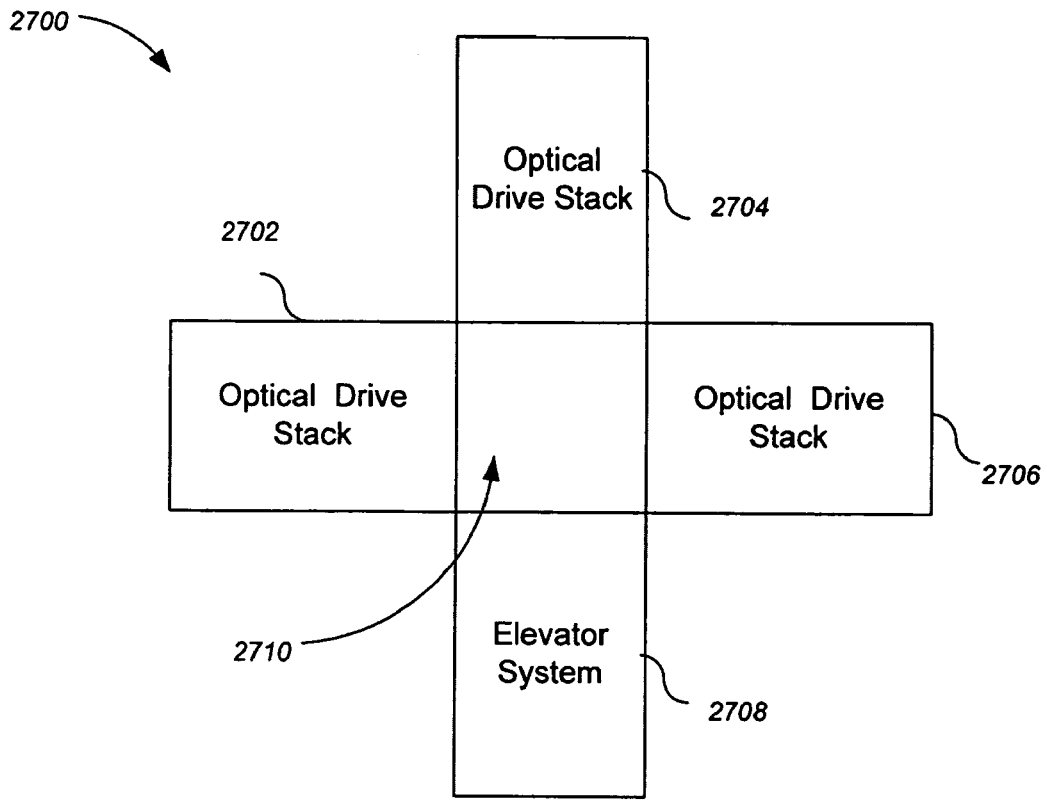
FIG. 27 shows a block diagram of an example disk handling system.

FIG. 27 shows an example block diagram of a disk handling system 2700. The disk handling system 2700 includes optical drive stacks 2702, 2704, and 2706, and elevator system 2708. Each of the optical drive stacks 2702, 2704, and 2706 include one or more optical drives. The elevator system 2708 can be an elevator system similar to elevator system 2412 of FIG. 24. Optical drive stack 2704 is positioned opposite the elevator system 2708 while the optical drive stacks 2702 and 2706 are positioned to the left and right of the elevator system 2708, respectively. Thus, the optical drive stacks 2702, 2704, and 2706 and elevator system 2708 form a central opening 2710 from which the elevator system 2708 can load and unload disks from extended trays in any of the optical drive stacks 2702, 2704, and 2706.

Figure 28:
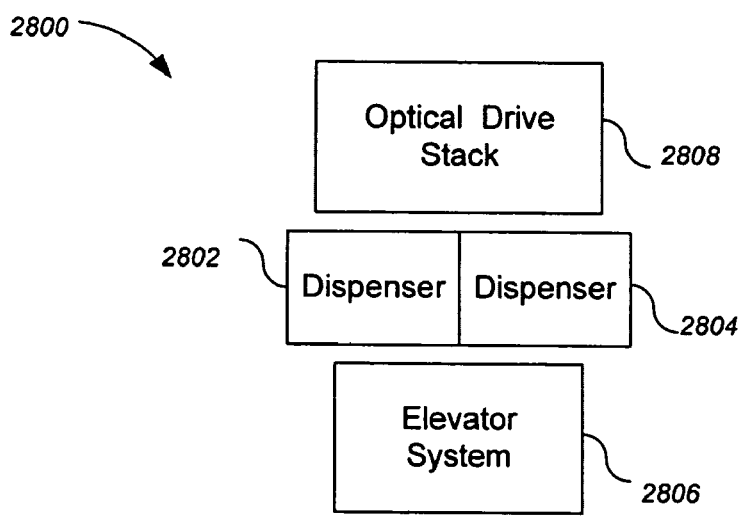
FIG. 28 shows a block diagram of an example disk handling system.

FIG. 28 shows an example block diagram of a disk handling system 2800. The disk handling system 2800 includes two dispensers 2802 and 2804, an elevator system 2806, and an optical drive stack 2808. The optical drive stack 2808 includes one or more optical drives. Each dispenser 2802 and 2804 is configured to dispense individual optical disks to the elevator system 2806. In one implementation, the dispensers are similar to the dispenser 2406 of FIG. 24.

The elevator system 2806 can be similar to the elevator system 2412 of FIG. 24. However, the arm of the elevator system 2806 can be configured to provide lateral motion, allowing the arm to receive optical disks from both dispensers 2802 and 2804. For example the arm can include a pivot joint or the arm can be configured for translational motion in addition to the vertical motion. In an alternative implementation, there can be additional optical drive stacks and/or additional dispensers in the disk handling system 2800.

Figure 29:
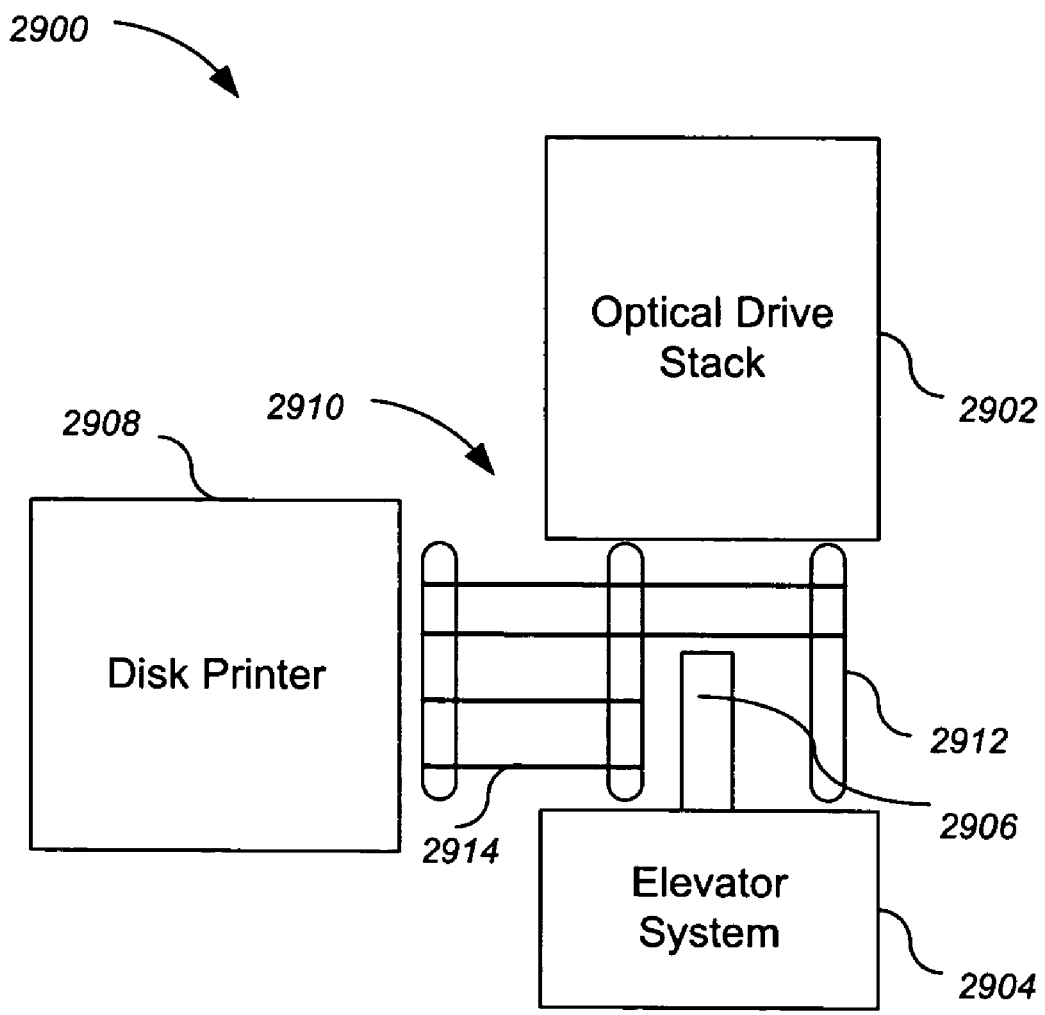
FIG. 29 shows an example block diagram of a disk handling system.

FIG. 29 shows an example block diagram of a disk handling system 2900. The disk handling system 2900 includes an optical drive stack 2902, elevator system 2904 including loading/unloading arm 2906, disk printer 2908, and conveyer 2910. The optical drive stack 2902 includes one or more optical drives (e.g., disk recorders). The elevator system 2904 can load disks dispensed from a disk dispenser (not shown) positioned above the elevator system 2904 and such as a dispenser described above (e.g., dispenser 2406 of FIG. 24). The elevator system 2904 can also load and unload disks from the one or more optical drives in the optical drive stack 2902.

The conveyer 2910 includes rollers 2912 coupled by bands 2914. The conveyer 2910 is configured such that the arm 2906 of the elevator system 2904 can pass between the conveyer 2910 to unload a disk. In one implementation, as shown in FIG. 29, a portion of the bands 2914 extend across all of the rollers 2912, while another portion of the bands 2914 only extend across some of the rollers 2912 in order to allow a gap for the arm 2906 to pass between rollers 2912 of the conveyer 2910. However, other conveyer configurations can also be used, which can receive disks from the arm 2906 and transport the disks to the disk printer 2908.

In operation, the arm 2906 can receive a disk from an optical drive in the optical drive stack 2092 or from the disk dispenser. The arm 2906 can then be lowered by the elevator system 2904 beneath the conveyer 2910 by passing through a gap between rollers 2912. The conveyer 2910 holds the disk as the arm 2906 moves beneath the conveyer 2910 thereby unloading the disk (e.g., from a spindle coupled to the arm 2906).

The rollers 2912 can controllably rotate such that when a disk is unloaded to the conveyer 2910, the bands 2914 carry the disk to the disk printer 2908. The disk printer 2908 can then print (e.g., label) and output the received disks.

While this specification contains many specifics, these should not be construed as limitations on the scope of what may be claimed, but rather as descriptions of features specific to particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The subject matter of this specification has been described in terms of particular embodiments, but other embodiments can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A disk handling system, comprising:
    a dispenser operable to dispense individual optical disks;
    one or more drives; and
    a vertically sliding elevator operable to transport optical disks received from the dispenser to the one or more drives along a first axis, the elevator comprising:
        a horizontal arm having a distal end and a proximal end,
        a spindle coupled to a top side of the distal end of the arm and configured to hold an optical disk,
        a base coupled to the proximal end of the arm and configured to slidably attach the arm to one or more side walls of an aperture formed in a wall, the wall positioned in a plane substantially perpendicular to a plane of the arm, and
        a lifting means coupled to the base, the lifting means operable to selectively move the arm along the first axis.

2. The system of claim 1, where the elevator is configured to receive an optical disk from one of the one or more drives and transport the optical disk to a conveyer.

3. The system of claim 1, where the lifting means selectively moves the arm vertically to selectively raise or lower the arm.

4. The system of claim 1, where the slider includes one or more grooves configured to position the base between the side walls of the aperture.

5. The system of claim 1, where the lifting means comprises:
    a first rotatable member;
    a second rotatable member;
    a first material looped around the first and second rotatable member, the first material coupled to the slider; and
    a motor coupled to the first rotatable member such that the motor can rotate the first rotatable member.

6. The system of claim 5, where the first and second rotatable members are coupled to the wall proximate to the aperture such that the rotation of the rotational members causes the first material to move the arm along the first axis.

7. The system of claim 5, where the first and second rotatable members are cylindrical and include a groove along circumference of the each of the first and second rotatable members, the groove configured to hold the first material.

8. The system of claim 5, further comprising:
    control circuitry operable to control the operation of the motor.

9. The system of claim 5, where the first material is a cable.

10. The system of claim 5, where the first material is a chain.

11. The system of claim 1, where the spindle is substantially cone shaped and configured to hold an optical disk.

12. The system of claim 1, further comprising:
    a second dispenser, where the horizontal arm is configured to pivot such that the spindle selectively receives optical disks from either dispenser.

13. The system of claim 1, further comprising:
    a second dispenser, where the horizontal arm is configured to move along a second axis such that the spindle selectively receives optical disks from either dispenser.

14. The system of claim 1, where the dispenser is configured to dispense a single optical disk from a bottom of a stack of optical disks.

15. The system of claim 1, further comprising a hopper configured to hold a stack of optical disks above the dispenser.

16. The system of claim 1, where the one or more drives are arranged beneath the dispenser.

17. The system of claim 1, further comprising:
    a plurality of stacks, each stack having one or more drives, where the stacks are positioned such that the elevator is operable to transport disks received from the dispenser to the one or more drives in each stack of the plurality of stacks.

18. The system of claim 1, further comprising:
    a conveyer operable to remove optical disks from the system.

19. The system of claim 18, where the conveyer is positioned beneath the one or more drives.

20. The system of claim 18, where an output of the conveyer is coupled to a printing device.

21. The system of claim 1, where the one or more drives are configured to record data.

22. The system of claim 1, where the one or more drives are configured to print data to a surface of an optical disk.

23. The system of claim 1, where the dispenser comprises:
   a first member configured to support a bottom disk of a vertical stack of disks, the first member including a horizontal surface that is configured to receive an outer edge of the bottom disk so that a bottom surface of only the outer edge rests on the horizontal surface;
   a second member operable in response to actuation to push the outer edge of the bottom disk off the horizontal surface, the second member having a thickness that is substantially equal to or less than a thickness of the bottom disk so that only the bottom disk is pushed; and
   a third member configured to prevent an outer edge of a next-to-bottom disk of the vertical stack of disks from being pushed off the horizontal surface when the second member pushes the bottom disk, the third member having a side surface configured to act as a stop, wherein actuation of the second member pushes only the bottom disk off the horizontal surface causing only the bottom disk to fall out of the dispenser.

24. A system comprising:
   means for dispensing individual optical disks;
   one or more optical drives; and
   a vertically sliding elevator means for transporting optical disks received from the dispensing means to the one or more optical drives along a first axis, the elevator means comprising:
   a horizontal arm having a distal end and a proximal end,
   a spindle coupled to a top side of the distal end of the arm and configured to hold an optical disk,
   a base coupled to the proximal end of the arm and configured to slidably attach the arm to one or more side walls of an aperture formed in a wall, the wall positioned in a plane substantially perpendicular to a plane of the arm, and
   a lifting means coupled to the base, the lifting means operable to selectively move the arm along the first axis.

* * * * *